United States Patent
Martin

(10) Patent No.: US 8,985,317 B2
(45) Date of Patent: Mar. 24, 2015

(54) CONVEYOR STRUCTURE AND METHOD FOR HANDLING

(71) Applicant: Andrew Jon Martin, Brighton (AU)

(72) Inventor: Andrew Jon Martin, Brighton (AU)

(*) Notice: Subject to any disclaimer, the term of this patent is extended or adjusted under 35 U.S.C. 154(b) by 0 days.

(21) Appl. No.: 14/051,721

(22) Filed: Oct. 11, 2013

(65) Prior Publication Data

US 2014/0102864 A1 Apr. 17, 2014

(30) Foreign Application Priority Data

Oct. 12, 2012 (AU) .............................. 2012904459

(51) Int. Cl.
*B65G 15/60* (2006.01)
*B65G 39/12* (2006.01)
*B65G 15/08* (2006.01)

(52) U.S. Cl.
CPC .............. *B65G 15/60* (2013.01); *B65G 39/125* (2013.01); *B65G 15/08* (2013.01)
USPC ...... 198/828; 198/818; 198/860.1; 198/860.2

(58) Field of Classification Search
USPC ......... 198/583, 595, 812, 818, 825, 828, 827, 198/830, 837, 842, 860.1, 860.2, 861.1
See application file for complete search history.

(56) References Cited

U.S. PATENT DOCUMENTS

| | | | | |
|---|---|---|---|---|
| 2,514,715 A | * | 7/1950 | Milik | 198/830 |
| 2,793,738 A | * | 5/1957 | Erickson | 198/860.1 |
| 3,104,009 A | * | 9/1963 | Ramer | 198/830 |
| 4,245,738 A | * | 1/1981 | Butcher et al. | 198/812 |
| 4,524,864 A | * | 6/1985 | Peterson, II | 198/828 |
| 5,366,068 A | * | 11/1994 | Hall et al. | 198/812 |
| 5,645,158 A | * | 7/1997 | Polka et al. | 198/812 |
| 5,762,179 A | * | 6/1998 | Oury et al. | 198/861.1 |
| 5,850,903 A | * | 12/1998 | Walters | 198/588 |
| 5,979,642 A | | 11/1999 | Hall et al. | |
| 6,095,320 A | | 8/2000 | DeMong | |
| 6,237,753 B1 | * | 5/2001 | Walter et al. | 198/824 |
| 6,659,269 B1 | | 12/2003 | Roberts et al. | |
| 7,823,715 B2 | * | 11/2010 | Kinnunen et al. | 198/313 |
| 7,886,897 B2 | * | 2/2011 | Johanssen | 198/860.5 |
| 8,028,814 B1 | * | 10/2011 | Szalankiewicz et al. | 198/303 |
| 8,177,055 B2 | * | 5/2012 | Zamorano | 198/828 |
| 2013/0292233 A1 | * | 11/2013 | Arif | 198/837 |

FOREIGN PATENT DOCUMENTS

| | | |
|---|---|---|
| AU | 2006203393 | 3/2007 |
| AU | 2010200261 | 11/2010 |
| AU | 2010257413 | 1/2011 |

* cited by examiner

*Primary Examiner* — Leslie A Nicholson, III
*Assistant Examiner* — Keith R Campbell
(74) *Attorney, Agent, or Firm* — Bay State IP, LLC

(57) ABSTRACT

A bay for a belt conveyor structure, the bay includes a transverse support stand having a first part that is positionable adjacent one longitudinal edge of the belt. The transverse support stand also includes a second part that is positionable adjacent the other longitudinal edge of the belt. A third part of the transverse support stand spans between the first part and the second part. The bay also includes a stringer having a proximal end removeably attachable to the stand and a distal end which is for engagement with a subsequent bay. The proximal end of the stringer is attachable to the first part of the stand at at least two spaced apart locations. The proximal end of the stringer is also attachable to the third part of the stand.

15 Claims, 29 Drawing Sheets

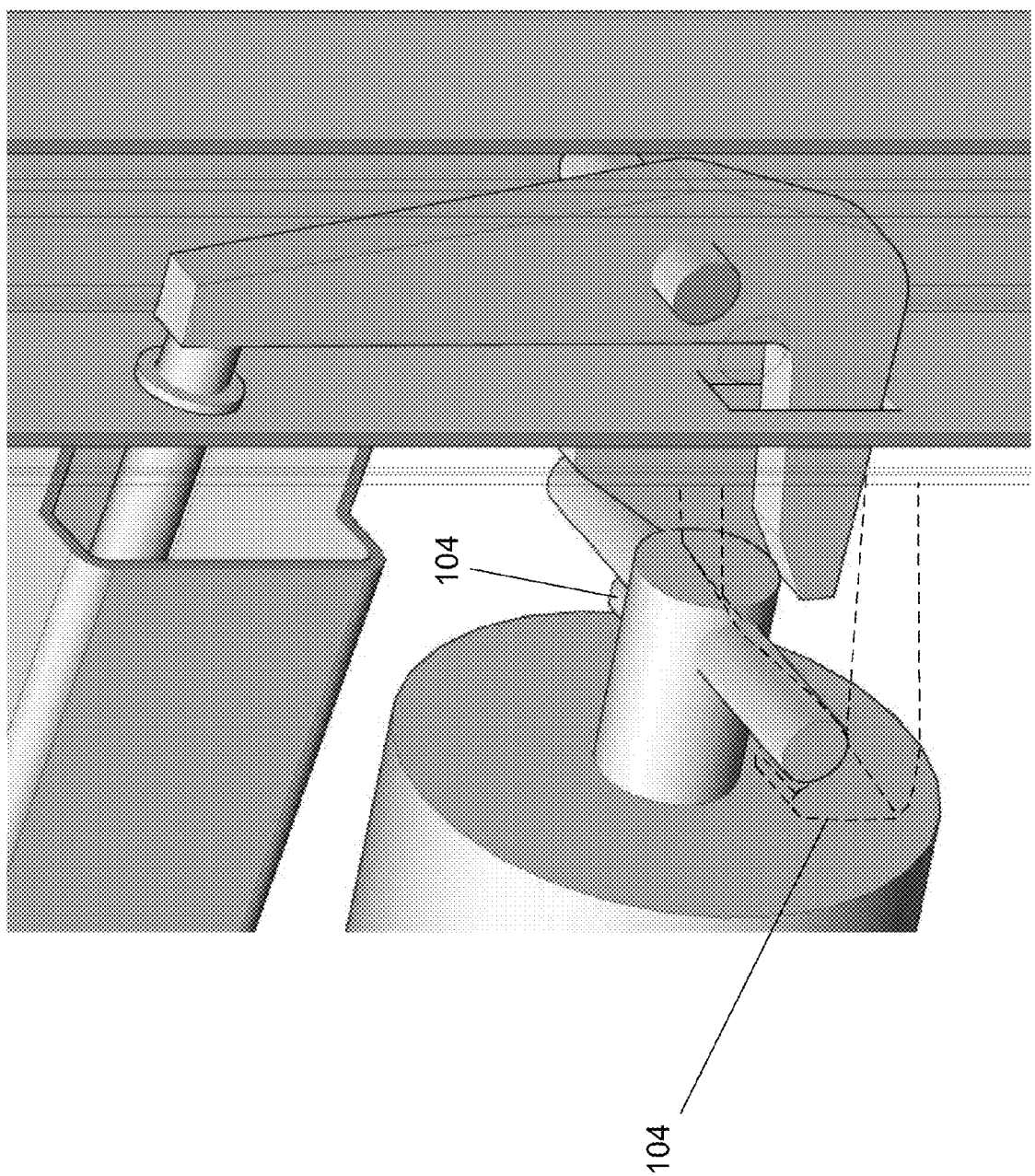

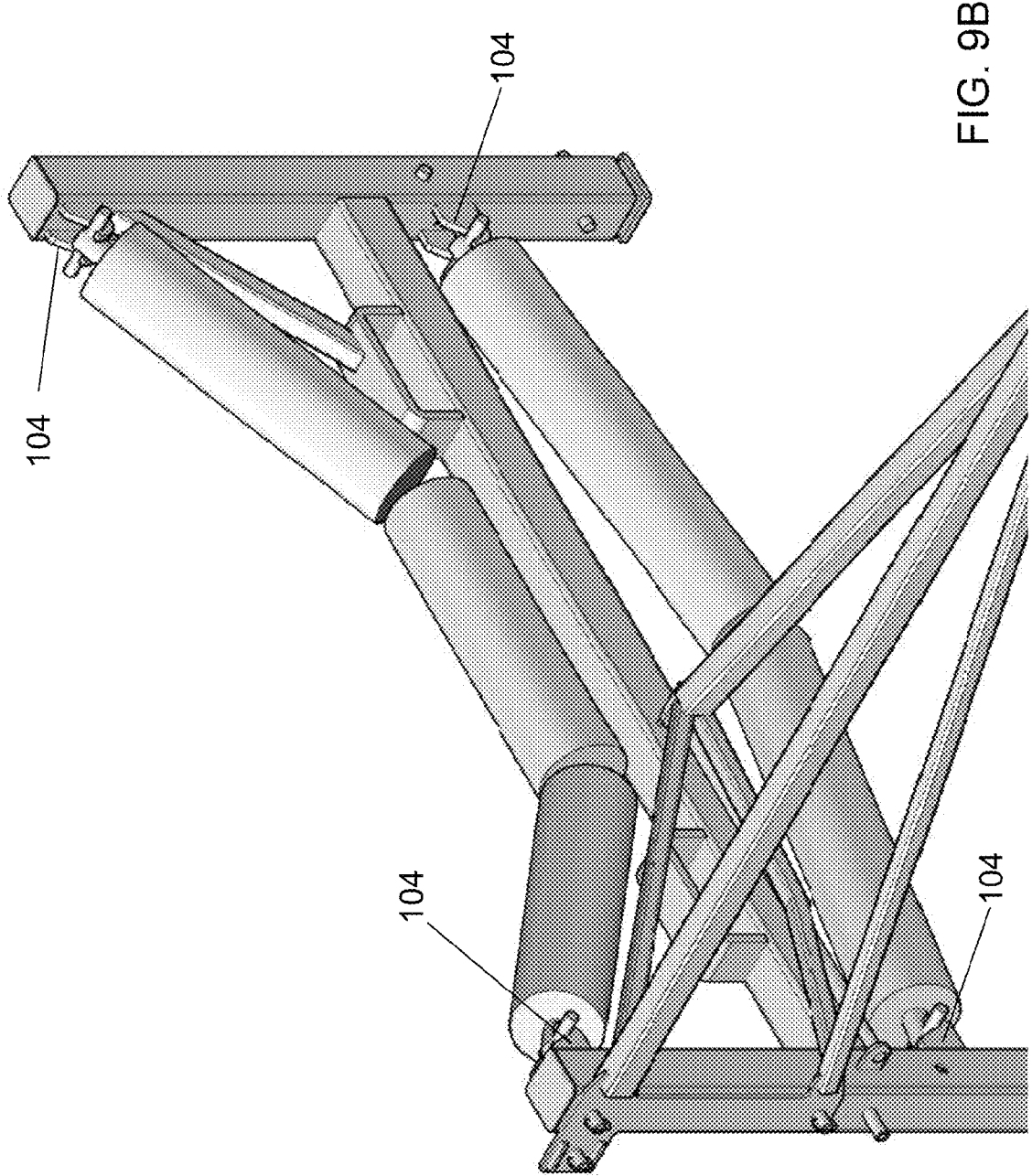

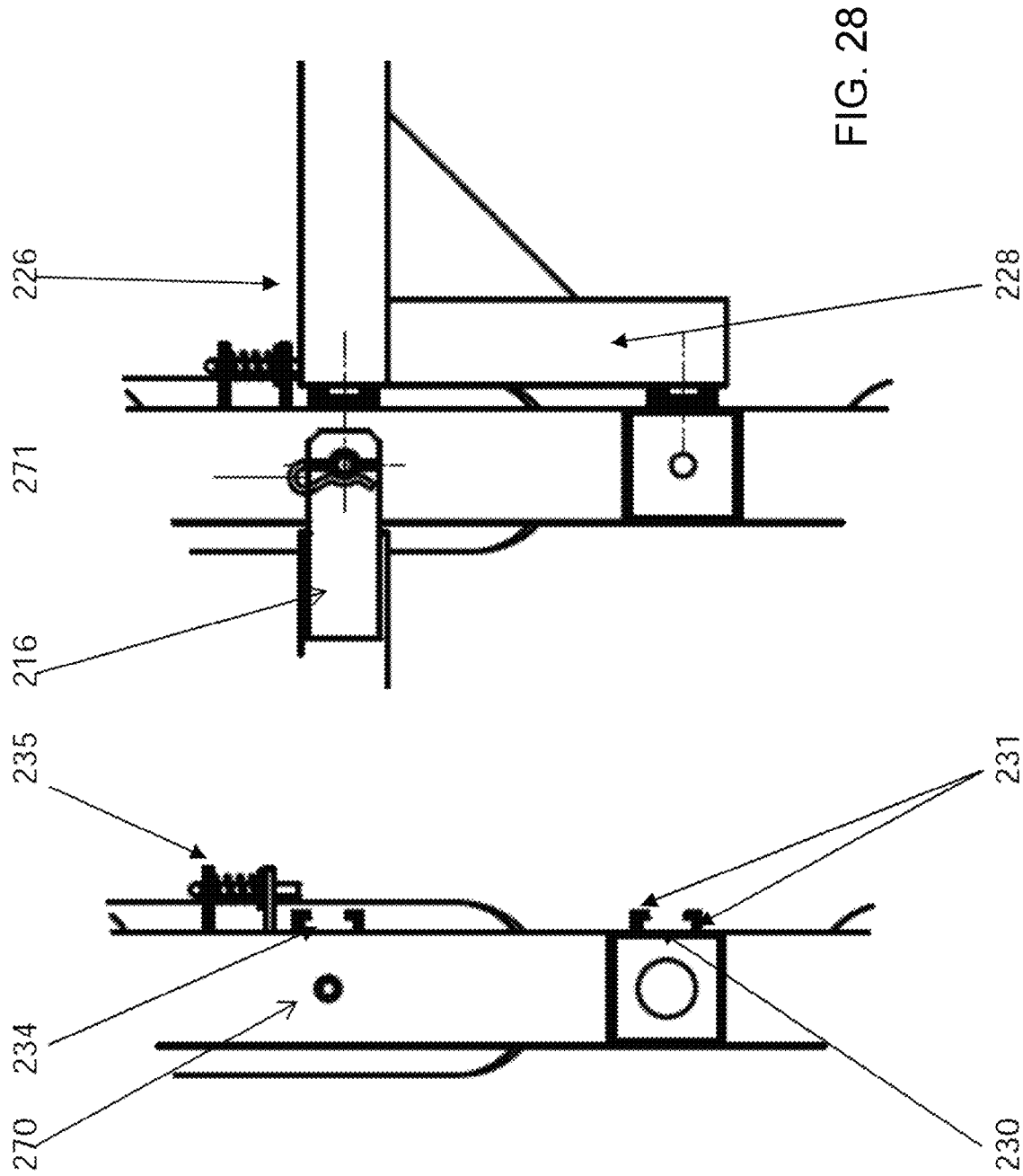

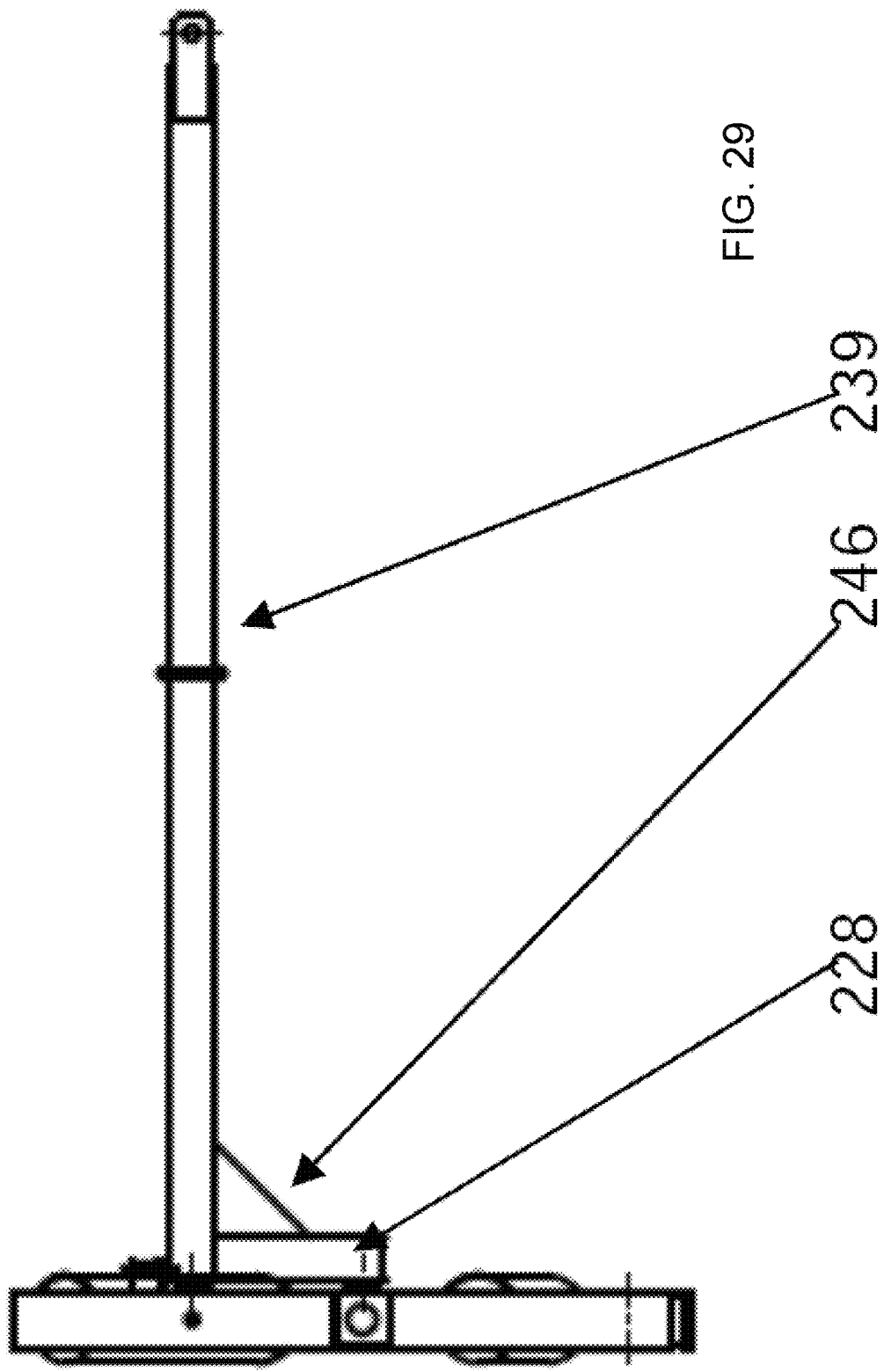

CONVEYOR STRUCTURE AND METHOD FOR HANDLING

CROSS REFERENCE TO RELATED APPLICATION

This application takes priority from and claims the benefit of Australian Patent Application Serial No. 2012904459, filed on Oct. 12, 2012 the contents of which are herein incorporated by reference.

TECHNICAL FIELD

The present invention is directed to a conveyor belt apparatus (structure) comprising a plurality of modules (bays) of special design which can be more easily removed or added to shorten or lengthen the conveyor. The invention may also be directed to a particular method to remove a said bay and to a machine to assist in bay removal.

The present invention may also be directed to a belt conveyor system used for conveying material extracted via a mobile mining unit, transporting the material from the mining unit to a fixed delivery location outbye. More particularly, the present invention may be directed to a belt conveyor structure and associated method for recovering or installing the structure as the mining unit retreats or advances, providing for considerably reduced manual handling requirements and reduced conveyor stoppage duration.

BACKGROUND

The background art will refer to the disadvantages associated with reducing a conveyor length specifically associated with transporting run of mine coal from a longwall mining unit. However, this is for the purposes of explanation only and the invention is applicable to all types of belt conveyor systems where there is a need to adjust the length of the conveyor and there are problems associated with this which are similar to the problems found in a longwall mining method.

Traditionally, material extracted using the retreat longwall mining method is transported away from the mining unit using a belt conveyor. The belt conveyor consists of an endless belt, providing for upper carry and lower return belt strands which are supported by a system of idlers mounted by framework, with the idler and framework arrangement commonly referred to as "structure".

The structure is made up of repeated units (modules) of fixed length, with each unit commonly referred to as a "bay". Each bay of structure typically consists of the following major components:

H-frame—a transverse support stand comprising a horizontal cross member fitted with two vertical legs, to define an "H" configuration. The frame incorporates connection arrangements to mount stringers, bracing, a return idler set to support the return belt strand and a carry idler set (depending on the structure configuration) to support the carry belt strand;

Stringers—two fixed length spacer bars (one each side of the conveyor belt—that is the "walk" side and the "non-walk" side) connected to the H-frame legs to locate and support the H-frame at a regular interval (to suit conveyor belt support requirements), and depending on the structure configuration arrangement to mount carry idlers (to support the carry belt strand);

Bracing—two types of bracing including i) short rigid members connected between the H-frame legs and the stringers to provide stiffness to the H-frame to stringer connection, positioning the H-frame nominally perpendicular to the ground, and ii) longer rigid members connected diagonally between adjacent H-frame legs located on each end of a structure bay to ensure squareness of the structure bay;

Carry idler set—depending on the structure configuration, one or two catenary set(s) comprising of multiple individual idlers, mounted each end to either the upper part of the H-frame legs or the stringers respectively;

Return idler set—a catenary set comprising of multiple individual idlers, mounted each end to the lower part of the H-frame legs.

The centreline of the conveyor belt structure is typically offset from the centreline of the underground roadway on which the structure is mounted thereby placing one side of the structure closer to one of the roadway walls. This results in the structure having a "non-walk" side (which is closest to the wall) and a "walk" side (where there is enough room between the structure and the opposing mine wall to allow passage of equipment and personnel). Even when not positioned adjacent a mine wall, it is common for a conveyor structure to have a walk side (which is safer to access) and a non-walk side (which should not be readily accessible).

For a longwall mining unit to retreat, the length of the conveyor structure needs to be reduced. This currently requires the structure to be dismantled and removed (recovered) to provide a clear path for the longwall bootend to travel. In the interests of practicality and efficiency, the structure must be recovered without cutting either of the conveyor belt strands. Therefore, the structure must be recovered from within the bounds of the conveyor belt strands.

A disadvantage is that the idler sets and stringers need to be disconnected and dismantled from both the walk side and non-walk side of the conveyor, which due to the proximity of personnel to moving conveyor components, presents a significant personal safety risk and requires the conveyor to be stopped.

The stopping of the conveyor belt means the mining unit cannot continue to mine coal, ceasing production.

Once a bay of structure has been dismantled, the components (located on the walk side, within the bounds of the conveyor belt strands and non-walk side of the conveyor) need to be manually moved to the walk side of the conveyor and away from the conveyor belt. A disadvantage is that to complete this activity safely, typically two mine personnel are required to handle the awkwardly shaped structure components, including the H-frame which may have a mass in excess of 50 kg.

Another disadvantage is that the activity of manually recovering the structure bay components provides a considerable risk to those mine personnel involved, through handling components of considerable mass and awkward shape, especially when considering the environment where the task occurs (often an uneven, wet floor in a poorly lit area).

Although the above description is provided for the case of reducing a conveyor length specifically associated with transporting run of mine coal from a longwall mining unit, it should be appreciated that the description is generally applicable for application in reverse (increasing length conveyor).

Any references to methods, apparatus or documents of the prior art are not to be taken as constituting any evidence or admission that they formed, or form part of the common general knowledge.

It is an object of the present invention to at least partially overcome or ameliorate one or more of the disadvantages of the prior art, or to provide a useful alternative.

SUMMARY OF THE INVENTION

According to a first aspect of the present invention there is provided a bay for a belt conveyor structure, the bay comprising:
- a transverse support stand having a first part positionable adjacent one longitudinal edge of the belt, a second part positionable adjacent the other longitudinal edge of the belt, and a third part between the first part and the second part, and
- a stringer having a proximal end removeably attachable to the stand and a distal end, the proximal end being attachable to the first part at at least two spaced apart locations and also to the third part, the distal end adapted for connection to a point fixed relative to an adjacent bay of conveyor belt structure.

Suitably a connection means is provided to enable the stringer to be attachable to the adjacent stand. At least part of the connection means may be provided on the distal end of the stringer.

The particular design of the bay and particularly the stringer allows the bay to have a single stringer on the walk side of the conveyor. That is, there is no need to have a second stringer on the non-walk side. This overcomes some of the existing disadvantages. Also, the particular design of the attachment of the stringer to the stand ensures that the structure is sufficiently rigid in operation. The particular design additionally makes removal of the stringer more straightforward.

The first and second parts of the transverse support stand may each comprise a leg member. The third part may comprise a cross member. Thus, the stand may comprise a "H" shaped frame having a cross member fitted with two legs (one at each end). The legs may be adjustable in length, inter alia, to allow for floor height differences.

Each leg member may be any suitable height. It is considered that a suitable height will be between 0.8 to 1.5 m although this will vary depending on the use of the belt conveyor. The height of the, or each, leg member may vary. For instance, the leg member may be length adjustable. As an example, the leg member may contain a length adjustable foot portion to accommodate uneven terrain. The leg member may be length adjustable by any suitable means. This may comprise a telescoping length adjustment or length adjustment using a thread arrangement, or the use of a separate attachable extension part. The leg may be locked at a suitable length by any suitable locking means such as a pin in slot arrangement, bolts, clips, clamps, and the like.

Each leg member and the cross member will typically be substantially tubular in configuration. Therefore, each member may comprise a box section or similar. There may be circumstances where it is desirable for part, or all of each member to be solid or partially solid—for instance for extra strength or reinforcement. It is expected that each member will be made of steel box section although this can vary to suit. For instance, the member may comprise an angled member (such as an L-shaped or C shaped member). The member may be formed with cutouts, slots, openings and the like, for instance to reduce weight or manufacturing cost. The member may be formed as a strong and rigid mesh or grid like member. Each member may be formed from multiple parts which can be attached together by any suitable means to form the member. For instance, each member may comprise two or more sub parts which can be attached by fasteners or welding or any other suitable means to each other. Alternatively, some form of attachment plate and the like can be used to connect the sub parts together. The sub parts may be identical or different to each other.

The cross member may be of any suitable length. This will depend, inter alia, on the width of the belt. It is expected that a suitable length of the cross member will be between 1 to 2.5 m although this may vary depending on the type of belt conveyor. There may be circumstances where more than one cross member may be required, for instance, to provide extra strength and reinforcing although it is considered most convenient that a single cross member is provided.

The transverse support stand need not be limited to be manufactured only by elongate members attached together. For instance, the transverse support member may comprise plate members which are attached relative to each other by any suitable means such as by fasteners, welding, adhesive and the like. It is envisaged that there may be circumstances where the transverse support stand is made of a single piece which may comprise a stamped piece or a cast piece.

The transverse support stand is conveniently manufactured from metal such as steel but there may be circumstances where other materials may be suitable such as metals other than steel (aluminium, alloys etc.), non-metal materials (engineering plastics non-metal laminates etc.), filled materials such as fibre filled materials or materials reinforced with internal mesh and the like. It is not considered that any unnecessary limitation should be placed on the material from which the transverse support member is manufactured.

The transverse support stand may include additional reinforcement if desired. These may be in the form of diagonal struts, a non-limiting example of which is identified as reference numeral 23 in FIG. 3, or other types of reinforcement.

The transverse support stand may include means to enable rollers (idlers) to be supported by the transverse support stand. The idlers may include a carry idler set—a catenary set comprising of multiple individual idlers, mounted each end to the upper part of the H-frame vertical members or; individual idlers mounted individually to the H-frame (i.e. not a catenary set), and a return idler set—a catenary set comprising of multiple individual idlers, mounted each end to the lower part of the H-frame vertical members.

It is preferred that the return idler set can be disconnected (dropped) from the transverse support stand by a disconnection mechanism. This may facilitate removal of the transverse support stand from between the upper (carry) and the lower (return) portions of the conveyor belt. This will be described in greater detail below. This may assist in overcoming a disadvantage with existing structures which are more difficult to disassemble and remove from the belt conveyor apparatus.

The bay further comprises a stringer. The stringer has a proximal end (closer to the transverse support stand) and a distal end (further away from the transverse support stand). The stringer is preferably attachable at its proximal end to the transverse support stand at three spaced apart locations. One advantage of this particular arrangement is that it enables a bay to be formed with only one stringer as opposed to other types of bays that require two stringers.

To enable this particular type of attachment, it is preferred that the stringer comprises an elongate first member (a non-limiting example of which is identified as reference numeral 26 in FIG. 4) to interconnect a pair of transverse support stands. The stringer preferably additionally comprises a second member (a nonlimiting example of which is identified as reference numeral 27 in FIG. 4) and a third member (a non-limiting example of which is identified as reference numeral 28 in FIG. 4). The first and second member preferably comprise metal box section, angled steel, or other suitable material whereas the third member is preferably plate steel. The second member preferably extends (in use) across the transverse support stand and therefore preferably has a length which is less than the width of the transverse support stand such that it does not unnecessarily project from the transverse support stand. The third member preferably extends (in use) in a substantially vertical manner along the transverse support member and preferably along the first part which may comprise a leg member. Bracing members (for example members 46a, 46b and 46c) are also preferably provided to strengthen the stringer and increase the rigidity of the joints between the first, second and third members.

Suitably, the second member (e.g. Item 27 in FIG. 4) is inclined relative to the third member (e.g. item 28 in FIG. 4).

Suitably, the proximal end of the stringer comprises the second member and the third member as well as a proximal end of the elongate first member, and the stringer is attached to the transverse support member at at least two spaced apart locations which are on the third member (e.g. 85, 87 in FIG. 4) and at at least one location (e.g. item 79 in FIG. 4) which is fast with the second member. This will be described in greater detail below.

It is also envisaged that the proximal end of the stringer and especially the second member and the third member may be combined into a plate like arrangement which can be attached to the elongate first member, as long as there is no conflict with the idler sets.

The stringer, and particularly the attachment arrangement of the stringer to the transverse support stand is preferably of a type that reduces the number of fasteners (such as nuts and bolts) that is required to attach the stringer to the transverse support stand. Thus, it is preferred that the attachment arrangement comprises at least one pin or rail on the transverse support member and a corresponding engagement member on the stringer that can engage with the at least one pin or rail etc. on the transverse support member. In a particularly preferred embodiment, the transverse support stand is provided with a rail extending at least partially across the transverse support stand and typically in a substantially horizontal manner (in use), and that one of the attachments of the stringer, e.g. the aforementioned engagement member, to the support stand uses the rail. Suitably, the arrangement of the pin, rail etc. and the engagement member is such that the engagement member can slide along the rail but captures the rail along most of its length such that it cannot be pulled from the rail but can only be removed by sliding the engagement member to a necked region of the rail. In a particular embodiment of the invention the engagement member comprises a slotted clevis.

Suitably, the walk side upright of the stand includes at least one releasable locking means to releasably retain a proximal end of the stringer to the transverse support stand. Suitably, the releasable locking means is associated with corresponding engagement formations of the third member of the stringer. Suitably, the releasable locking means comprises one or more anti-luce pins which traverse corresponding holes formed through the third member of the stringer. In this manner, the stringer can be securely fastened to the transverse support stand but still able to be removed in a convenient manner and without the requirements of multiple securing aids.

Preferably, the stringer comprises a removable spacer bar connected to the H-frames to locate and support the H-frame at a regular interval (typically 2.5 m). An advantage of the particular design of the stringer is that it can be more conveniently removed from the transverse support stand. That is, conventional stringers may be more difficult to remove as they may be fitted using multiple fasteners which may be inconvenient to remove, or they may use gravity/load to lock the assembly together, with release by removing the load and twisting a spigot in a slot etc. The bracing may require a more involved removal process with pins or alternatively bolt assemblies and may also require longer stopping of the conveyor belt during the removal process.

The structure can eliminate the requirement for a non-walk side stringer through the stringer design and connection arrangements to the H-frame. Hence, this can eliminate the requirement to access the non-walk side of the conveyor to remove a stringer.

The stringer is preferably located on the walk side of the structure and when connected to the inbye H-frame (the transverse support stand) forms a single rigid assembly. The stringer can provide rigidity to maintain the inbye H-frame nominally perpendicular to the ground (when viewed from the side) plus perpendicular to the conveyor centre line (when viewed from the top). Hence, this can eliminate the requirement for additional bracing.

Suitably, the stringer is connected to the outbye H-frame (that is an adjacent transverse support stand) via a connection means which, in a preferred embodiment, comprises a pinned connection, allowing metered vertical articulation to cope with ground changes of grade. This will be described in greater detail below. Preferably the pinned connection comprises a pin extending outwardly from a proximal end of the next stringer which is received by a corresponding hole formed through a distal end of the preceding stringer.

As with most ground mounted structure, the transverse support stand typically comprises H-frame vertical member lengths which are suitably independently adjustable to level and grade the structure within the acceptable limits and cope with local dips or rises of the ground.

As mentioned previously, It is preferred that the return idler set can be disconnected (dropped) from the transverse support stand by a disconnection mechanism. This may facilitate removal of the transverse support stand from between the upper (carry) and the lower (return) portions of the conveyor belt. This will be described in greater detail below. This may assist in overcoming a disadvantage with existing structures which are more difficult to disassemble and remove from the belt conveyor apparatus.

The disconnection mechanism is typically supported by the transverse support stand. The disconnection mechanism may function to disconnect the return idler set from the return idler mounts which are typically attached to the transverse support stand, and which may be of conventional design. An advantage of this arrangement is that it disconnection mechanism can be actuated from the walk side of the conveyor and outside the bounds of the belt strands. The disconnection mechanism can reduce or eliminate the requirement to access the non-walk side of the conveyor to remove the return idler set.

Actuation of the return idler set disconnection mechanism can result in the return idler being dropped onto the ground clear of the return belt strand. The return idler set can then be removed from within the bounds of the conveyor belt strands manually using a simple hooked bar to hook the walk side end of the return idler set and drag it into the walk way.

The disconnection mechanism (hereinafter simply called the mechanism) may comprise a lifting hook or finger which can be actuated to remove the lower return idlers (rollers) from their mounts on the transverse support stand. The hook or finger (or something similar) can be actuated from one side of the transverse support member and preferably from the walk side. A nonlimiting example of this is illustrated at least in FIGS. 8 and 9.

In another form the invention resides in a particular method to remove a bay of structure from a conveyor and preferably in such a manner that the bay (that is the transverse support stand, stringer and carry and return idlers) can be removed without needing to cut the belts of the conveyor and preferably also without needing to stop the conveyor belt. The bay is preferably of the type described above.

Thus, in another form the invention resides in a method to remove a bay of structure from a conveyor, the method comprising:

gripping the transverse support stand,
lifting the carry belt off carry rollers of the transverse support stand,
dropping return rollers from the transverse support stand,
removing the stringer from the transverse support stand,
tilting the transverse support stand to a substantially horizontal position while the transverse support stand is still within the confines of the conveyor belt, and,
removing the substantially horizontal transverse support stand from the confines of the conveyor belt.

In this method, a transverse support stand and its associated stringer can be removed, typically from the walkway side of the belt conveyor, without needing to cut the conveyor belt or preferably without needing to stop the conveyor belt at all, or for an unnecessary long time. The method finds particular use with the particular type of bay according to the present invention, as the particular type of bay (with a single stringer) can have the stringer removed more easily than previously possible and therefore enables the stringer and the transverse support stand to be removed more easily.

The dropped return roller set can be pulled away from the conveyor belt using some form of a hook member and the like such that a person does not need to enter into the "belt zone" of the conveyor. This is preferably carried out before tilting and removing the transverse support stand.

It is preferred that once the transverse support stand has been removed from the confines of the conveyor, it is tilted back to the upright (substantially vertical) position such that it can be more easily handled and removed from the area. Suitably, the method for removing the transverse support stand from the belt zone intentionally orientates the transverse support stand in the correct orientation (parallel to) and general vicinity (underneath) of an overhead monorail system which can be used to assist the handling (weight bearing) of the frame.

In another form, the invention resides in an apparatus that can be used to undertake the method described above. Thus in another form, the method of removing the bay as described above can be undertaken by an apparatus as opposed to workers. The apparatus can comprise a "H-frame handling machine", with the H-frame being a preferable form of the transverse support stand.

In a preferred embodiment of this aspect of the invention there is provided a stand (e.g. "H-frame") handling apparatus including:

an upper roller assembly arranged to bring rollers thereof to a level above carry rollers of the transverse stand of the bay;
a lower roller assembly arranged to bring rollers thereof to a level above return rollers of said stand;
a grip and tilt assembly including grippers arranged to grasp and release the stand and further including a tilt actuator arranged to tilt the stand from a vertical orientation to an orientation for sideways motion between said upper rollers and said lower rollers; and
a horizontal swing assembly coupled to the grip and tilt assembly for swinging the stand from the upper rollers and the lower rollers.

The apparatus typically comprises a powered system which can be mounted to a mobile mining unit, located at the belt conveyor and mobile mining unit interface. The machine can eliminate the requirement for manual handling to recover (or install) the transverse stand, e.g. the H-frame, within the bounds of the conveyor belt strands.

The transverse stand handling apparatus, or as it is equivalently referred to herein, "the H-frame handling machine" typically comprises a number of mechanisms preferably operated in a fixed sequence which will be described.

Additionally, the H-frame handling machine geometry can intrinsically provide an envelope for handling of the H-frame within the bounds of the conveyor belt strands. These attributes can prevent equipment damage to both the conveyor system (structure and belting) plus the H-frame handling machine.

The H-frame handling machine is preferably mounted to the mobile mining unit via a machine support structure.

The H-frame handling machine support structure preferably provides powered adjustment as required to recover (or install) the H-frame when the mobile mining unit is within a defined distance from the conveyor structure.

If the handling machine is used, it is preferred that the transverse support member is provided with brackets or other engagement formations for the H-frame handling machine to grip the transverse support member plus connection arrangements to mount the stringer, carry idler set and return idler set.

A nonlimiting example of a concept of the apparatus (handling machine) is illustrated at least in FIGS. 10-13.

The apparatus preferably includes a lifting means adapted to lift the carry belt off the carry idler set supported by the transverse support stand. The lifting means may include at least one roller such that the carry belt is supported by the at least one roller. The lifting means may be operable between a lowered (non-use) position and a raised (lifting) position. An actuating means may be provided to operate the lifting means between the lowered position and the raised position. The actuating means may comprise a motor and/or a ram.

The apparatus preferably includes a lifting means to lift the return idler belt at a position adjacent the return idler set supported by the transverse support stand. The lifting means may comprise at least one roller. The lifting means may be operable between a non-use position and a use position. An actuating means may be provided to operate the lifting means. The actuating means may comprise a motor and/or a ram.

The apparatus preferably includes attachment means to allow the apparatus to attach to the transverse support stand. The attachment means may comprise at least one gripping member. Alternatively, the transverse support stand may comprise some form of bracket, opening and the like, and the apparatus may comprise some form of hook, projection or finger and the like which can engage with the bracket, openings etc to attach the apparatus to the transverse support stand. Other types of attachment means are envisaged which may include the use of electromagnets. Separate attachment means may be provided such as bands or straps or something similar to attach the apparatus to the transverse support stand. Other types of couplings are also envisaged.

The apparatus preferably comprises a tilting means to enable the transverse support stand to be tilted from the substantially vertical position to a substantially horizontal position. Suitably, the attachment means or a sub portion of the apparatus containing the attachment means can tilt to tilt the transverse support stand. At least one actuating means may be provided to tilt this part of the apparatus. The actuating means may comprise a ram or motor or the like.

The apparatus preferably comprises a part which contains (1) the attachment means which is adapted to attach to the transverse support stand and (2) the tilting means to tilt the transverse support stand from the substantially vertical use position to the substantially horizontal (removal) position. This part may comprise a frame assembly or as it is referred to subsequently, a "grip and tilt" assembly.

The frame assembly is suitably movable between a first (extended) position where the frame assembly is positioned adjacent the transverse support stand which is to be removed and enables the attachment means to attach the apparatus to the transverse support stand, and a second (retracted) position where the frame assembly (containing the transverse support stand) has been moved away from the confines of the conveyor belt. The movement is preferably a swinging or pivoting movement about a substantially vertical axis. The frame assembly may therefore swing between the first position and the second position. Suitably, a 4 bar linkage arrangement is provided which ensures the path taken by the horizontal transverse support stand requires the minimum envelope between the separated carry and return belt strands.

Other forms of the invention are envisaged. For instance, in another form the invention may comprise a transverse support stand for a belt conveyor comprising means to attach a carry idler set and means to attach a return idler set to the transverse support member and disconnection means to enable the return idler set to be disconnected from the transverse support member, the disconnection means being supported by the transverse support stand. In this form of the invention, the disconnection means may be as described previously and including a bell crank and push rod.

In another form the invention may comprise a transverse support stand for a belt conveyor and a stringer attachable to the transverse support stand, the transverse support stand being formed with at least one channel/slot etc and the stringer being formed with a plurality of mounting points adapted for engagement into the at least one channel/slot etc to attach the stringer to the transverse support stand. In this form of the invention, the at least one channel/slot and the at least one mounting point may be as described previously.

Although the invention has been described with reference to a specific example, it will be appreciated by those skilled in the art that the invention may be embodied in other forms.

BRIEF DESCRIPTION OF THE DRAWINGS

Preferred features, embodiments and variations of the invention may be discerned from the following Detailed Description which provides sufficient information for those skilled in the art to perform the invention.

The Detailed Description is not to be regarded as limiting the scope of the preceding Summary of the Invention in any way. The Detailed Description will make reference to a number of drawings as follows:

FIG. 9A. Is a view showing the mounting points to support a carry idler set.

FIG. 9B Is a further view showing the mounting points (items 104).

FIG. 27. Is a side view of the stand illustrating the shape of the channels and stringer securing method.

FIG. 28. Is the view of FIG. 12 with the stringer attached.

FIG. 29. Is a side view of the stand with the stringer attached (a bay of structure).

DETAILED DESCRIPTION OF PREFERRED EMBODIMENTS

Figure 1:
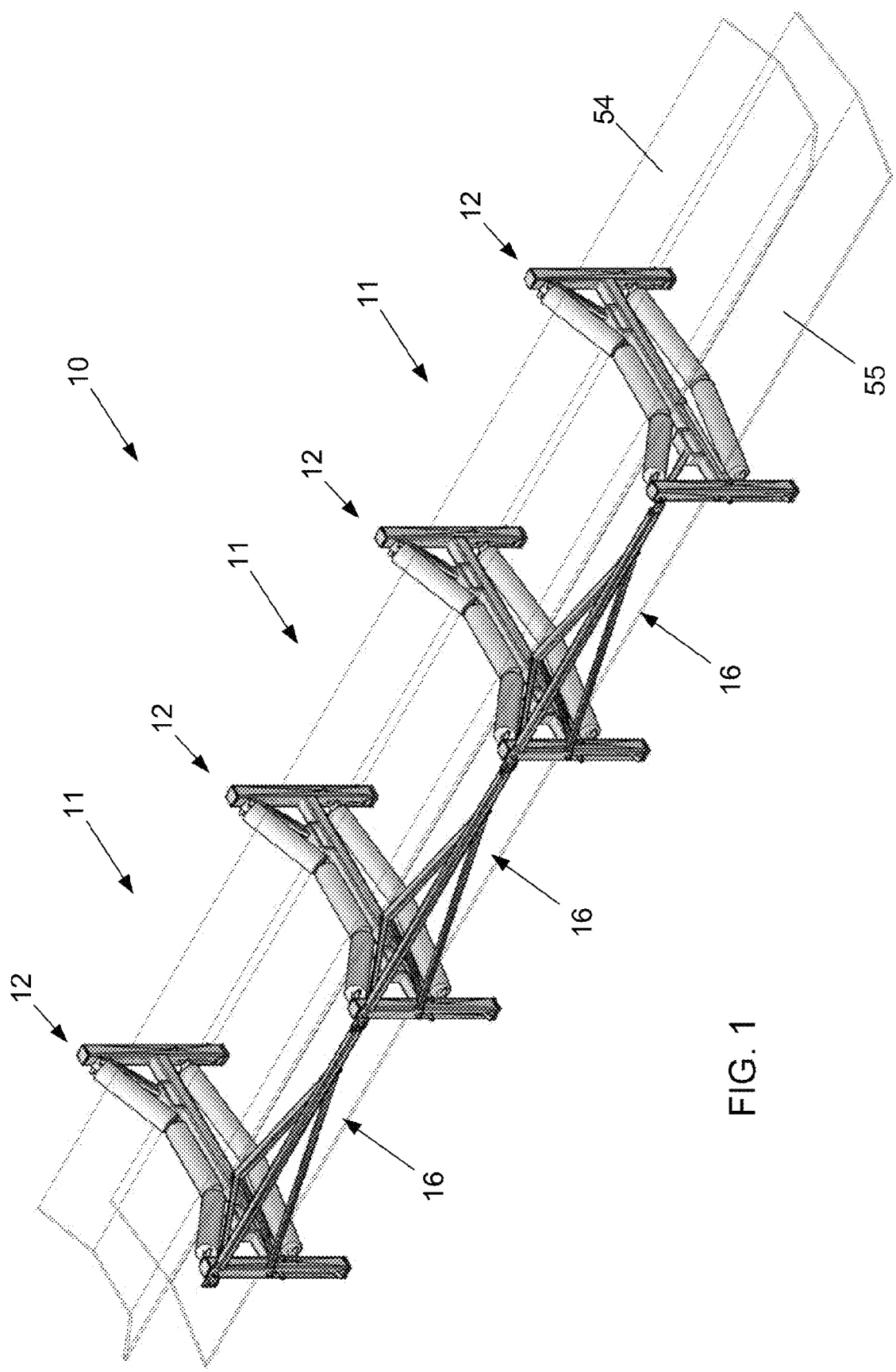
FIG. 1. Is an isometric view of a general arrangement of a belt conveyor illustrating three bays 11, of structure according to a preferred embodiment of an aspect of the present invention, wherein each bay comprises a transverse support stand coupled by a single stringer.
Figure 2:
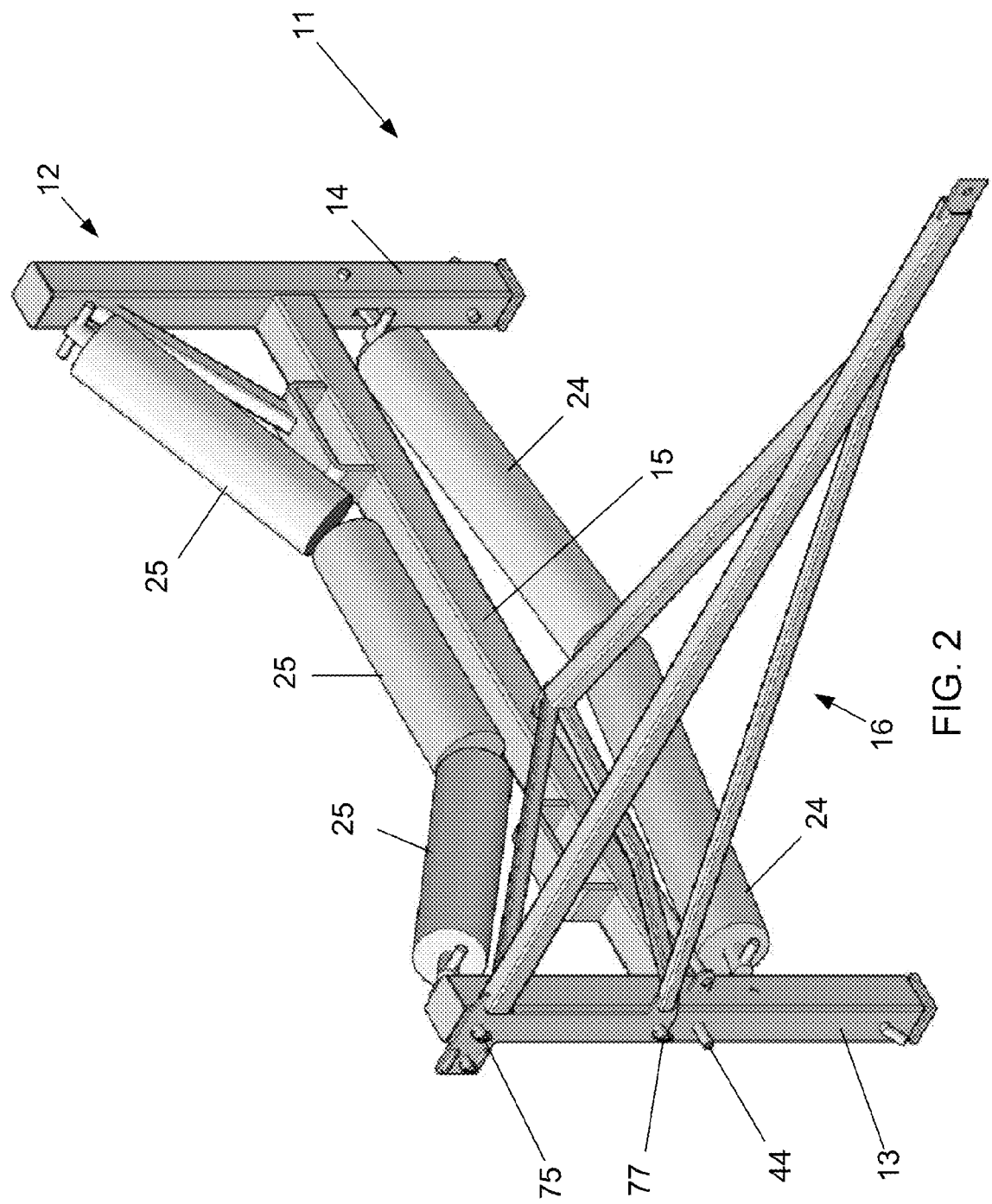
FIG. 2. Is a close up of one of the bays 11 of FIG. 1.

Referring to the drawings and initially to FIG. 1, there is illustrated part of a belt conveyor structure 10 comprising a number of spaced apart transverse support stands 12. In the particular embodiment, the stands 12 can be spaced apart by between 1.5-3.0 m. The stands 12 are identical to each other. Each stand 12 is coupled to an adjacent stand by a stringer 16, to form a rigid structure. However, the stands are not directly coupled rather, the rearward (i.e. the proximal) end of a stringer 16 is fastened to the forward (i.e. the distal end) of the next stringer and each of the stringers is also attached to their respective stand. A particular transverse support stand 12 and its attached stringer 16 comprises a "bay" 11 as illustrated in FIG. 2. The main function of each stand 12 is to support the upper (carry) part 54 of a conveyor belt and the lower (return) part 55 of the conveyor belt. The carry belt 54 will typically have a width of between 0.9-2 m.

Figure 3:
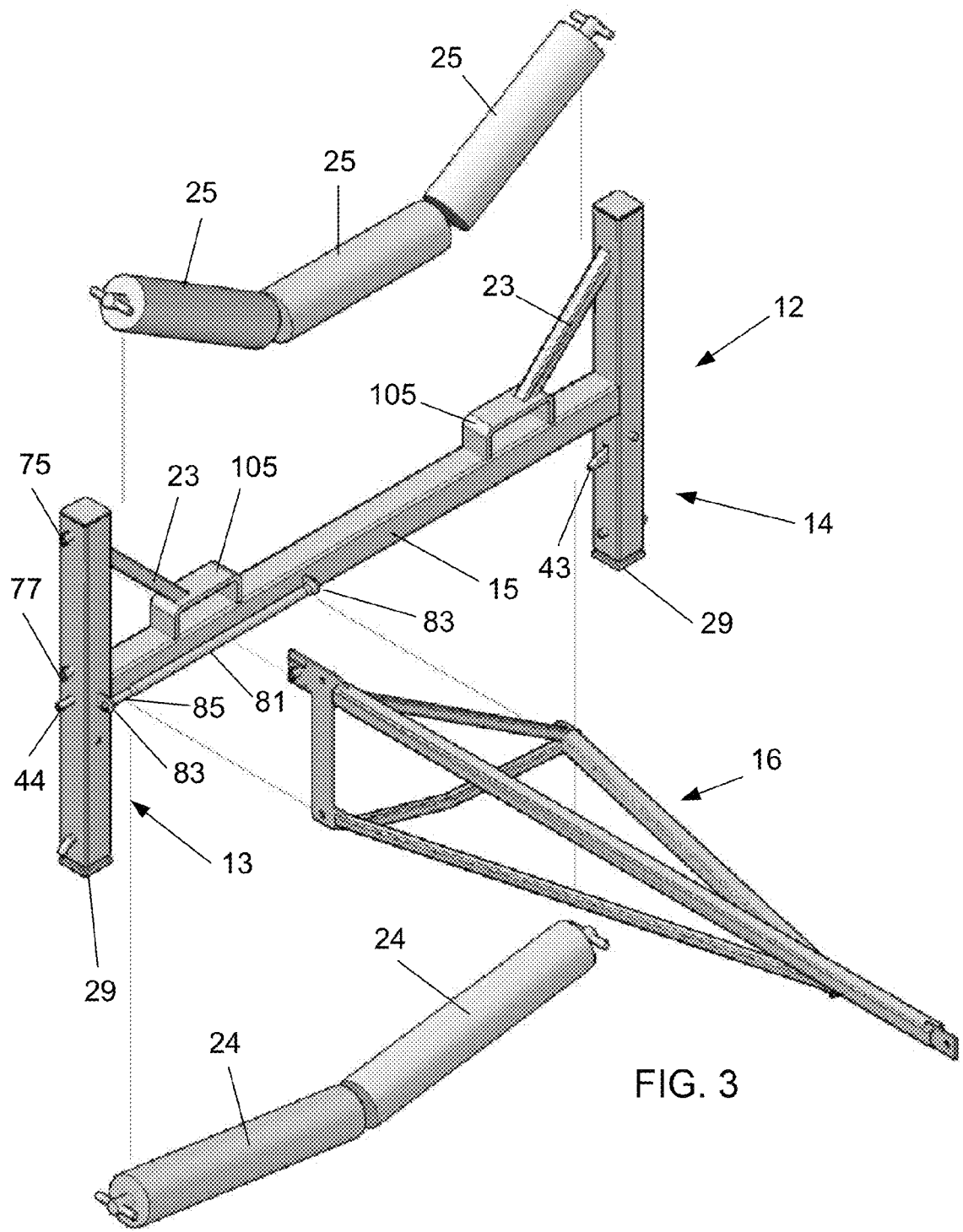
FIG. 3. Is an exploded view of the bay of FIG. 2.

Referring now to FIGS. 2 and 3, each stand 12 supports a carry idler set comprising three or five carry rollers 25 and supports a lower return idler set comprising two or three return rollers 24. The upper part 54 of the conveyor belt rides over the top of the carry rollers and the lower part 55 of the conveyor belt rides over the top of the return rollers.

The transverse support stand 12 is H shaped in configuration and therefore can also be called an "H-frame". Thus, stand 12 comprises a first part 13 in the form of an upright leg member on one side of the carry belt (the walk side) and a second part 14 in the form of another upright leg member on the other side of the carry belt (the non-walk side). The two leg members, 13 and 14 are interconnected by a third part which comprises a cross member 15. These members are formed from strong steel and are attached to each other. Each leg member will typically have a height of between 0.8-1.5 m. The cross member will have a length depending on the width of the carry belt and therefore will typically have a length of between 1.0-2.5 m.

The lower part of each leg member is provided with an adjustable foot 29 which can be extended or retracted to accommodate for unevenness in the floor surface. Bracing 23 is provided between the leg members and the cross member to provide a strong rigid unit.

The H-frame 12 is provided with mounting points to support the carry idler set 25 and the return idler set 24 these mounting points being conventional. The mounting points 104 are illustrated in FIG. 9A and FIG. 9B, they are not shown in the other drawings of the H-frame.

The H-frame 12 is provided with further attachments specifically designed to enable stringer 16 to be attached to the H-frame in a particular manner to provide a strong rigid attachment thereby enabling adjacent H-frames to be coupled by a single stringer 16 (instead of the more conventional pair of stringers) and also to enable the single stringer to be more conveniently removed and attached to the H-frame.

These attachments comprise an upper anti-luce pin 75 and a lower anti-luce pin 77 extending outwardly from the walk side of upright 13. The attachments further include a pin or rail 81 which extends laterally from upright 13 along cross member 15. The rail 81 is offset from the cross member by support brackets 83 which extend from opposite ends of the rail 81 to the upright 13 and the cross member 15 respectively. An outer end portion 85 of the rail 81 is necked, i.e. of reduced diameter compared to the rest of the rail. As will be explained, the neck portion allows for attachment of an engagement member portion of the stringer 16 to the rail 83 in use.

Figure 4:
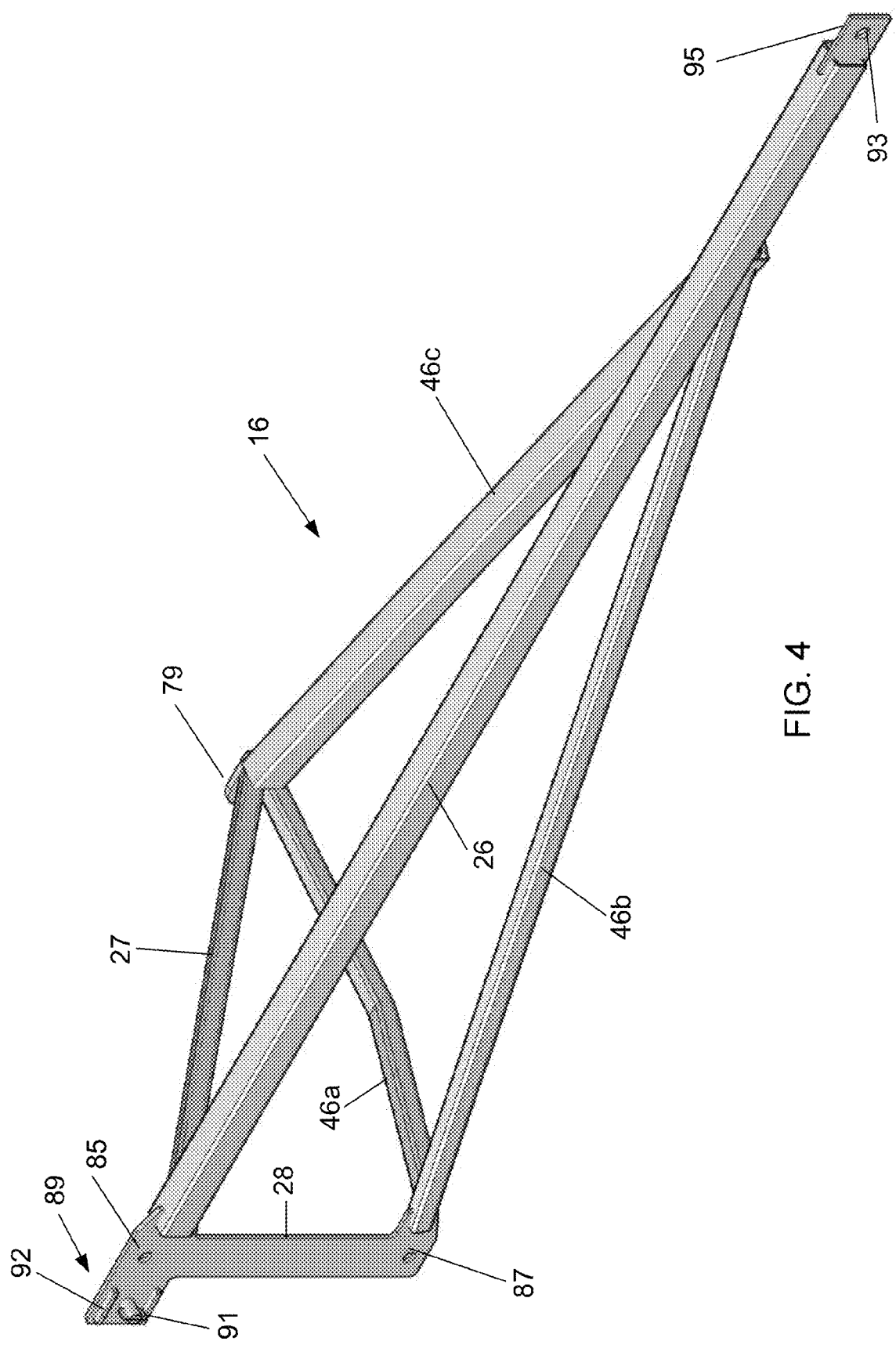
FIG. 4. Is a detail view of one of the stringers.

With reference to FIG. 4, the stringer 16 is of a special design. The stringer 16 comprises an elongate first longitudinal spacing member 26 and a shorter, second lateral member 27. The longitudinal member 26 extends from an upper region of a third, upright member 28 with its leading end terminating in a leading end (i.e. "outbye" end) attachment plate 95 which is formed with a through hole 93 to assist in fastening to the next bay. The second, lateral member 27 also extends from the upper region of the third member 28 and terminates with a slotted clevis 79 (best seen in FIG. 7). The slotted clevis 79 is designed so that the necked portion 85 of the attachment rail 81 can pass through the slot in the clevis 79 into an internal void so that the clevis can then be slid along the larger diameter portion of the rail 81 from whence it cannot be pulled off. Diagonal bracing members 46a, 46b, 46c are provided to reinforce the rigidity of the joins between the longitudinal first member 26, lateral second member 27 and upright member 28. It will be noted that the various members define a triangular pyramidal form which is particularly strong and rigid.

Figure 5:
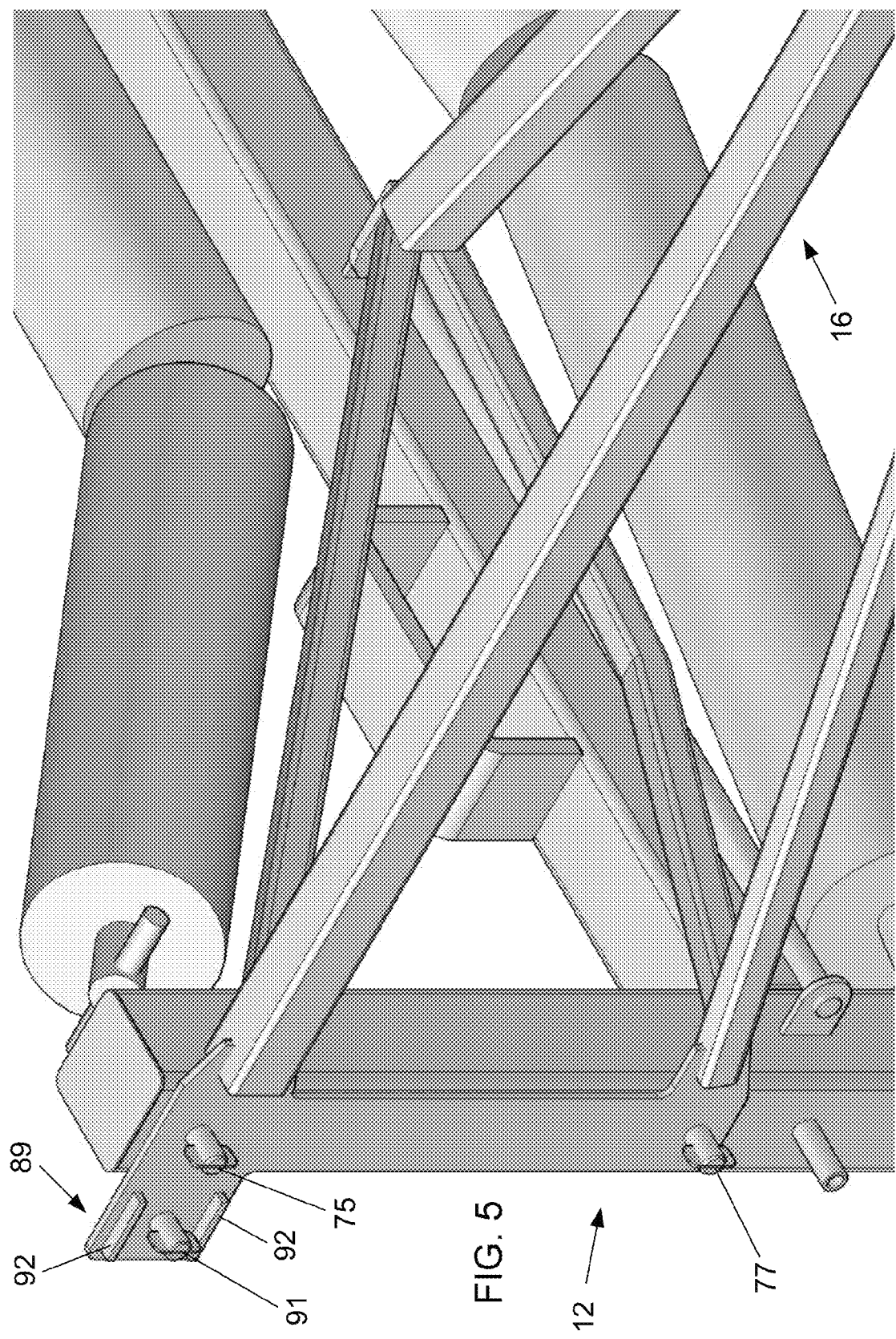
FIG. 5. Is a close up view of the top, front and walk side of the attachment of a proximal end of a stringer to an H-frame.
Figure 6:
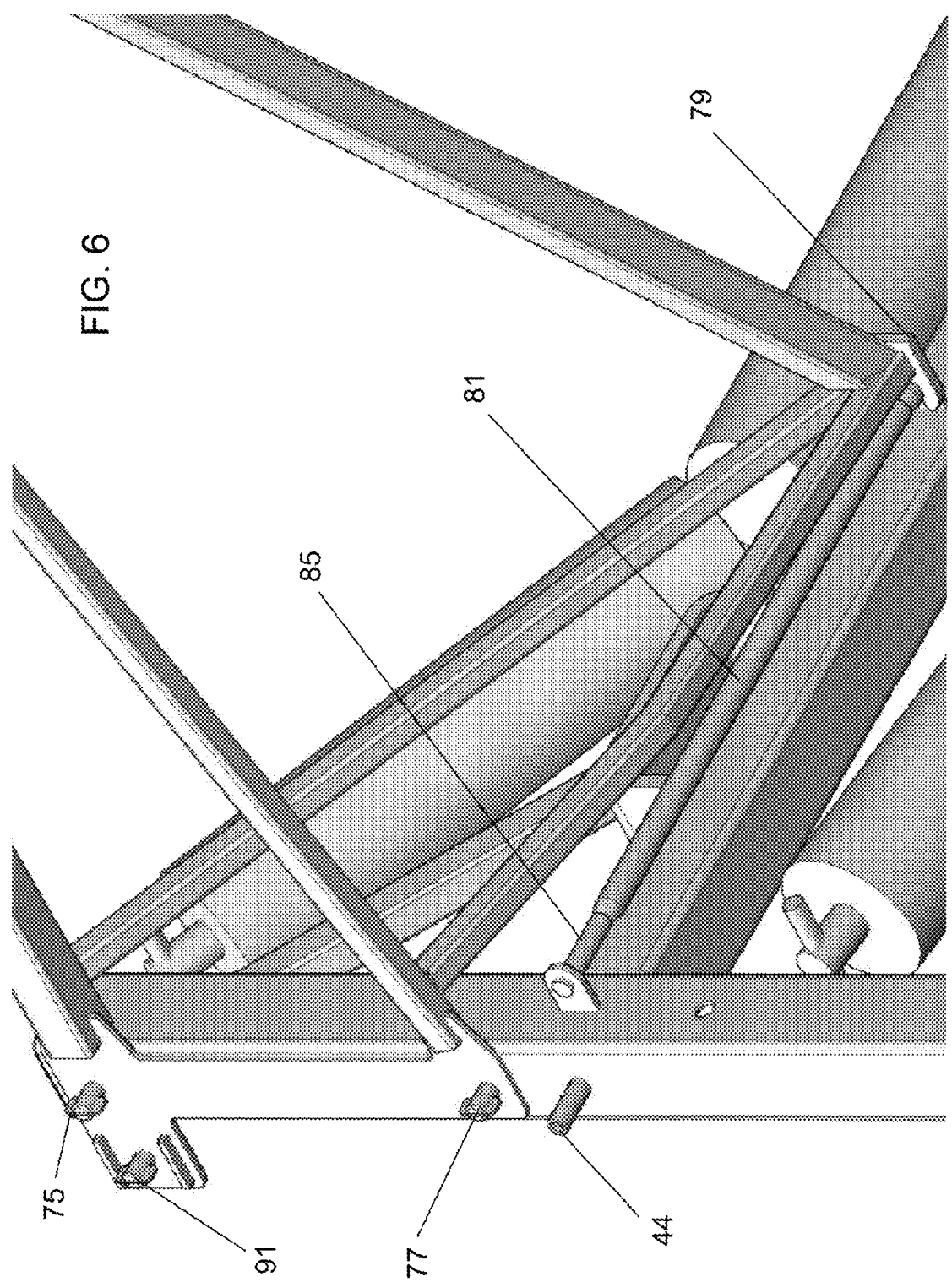
FIG. 6. Is a close up view of the underside, front and walk side of the attachment of a proximal end of a stringer to an H-frame.
Figure 7:
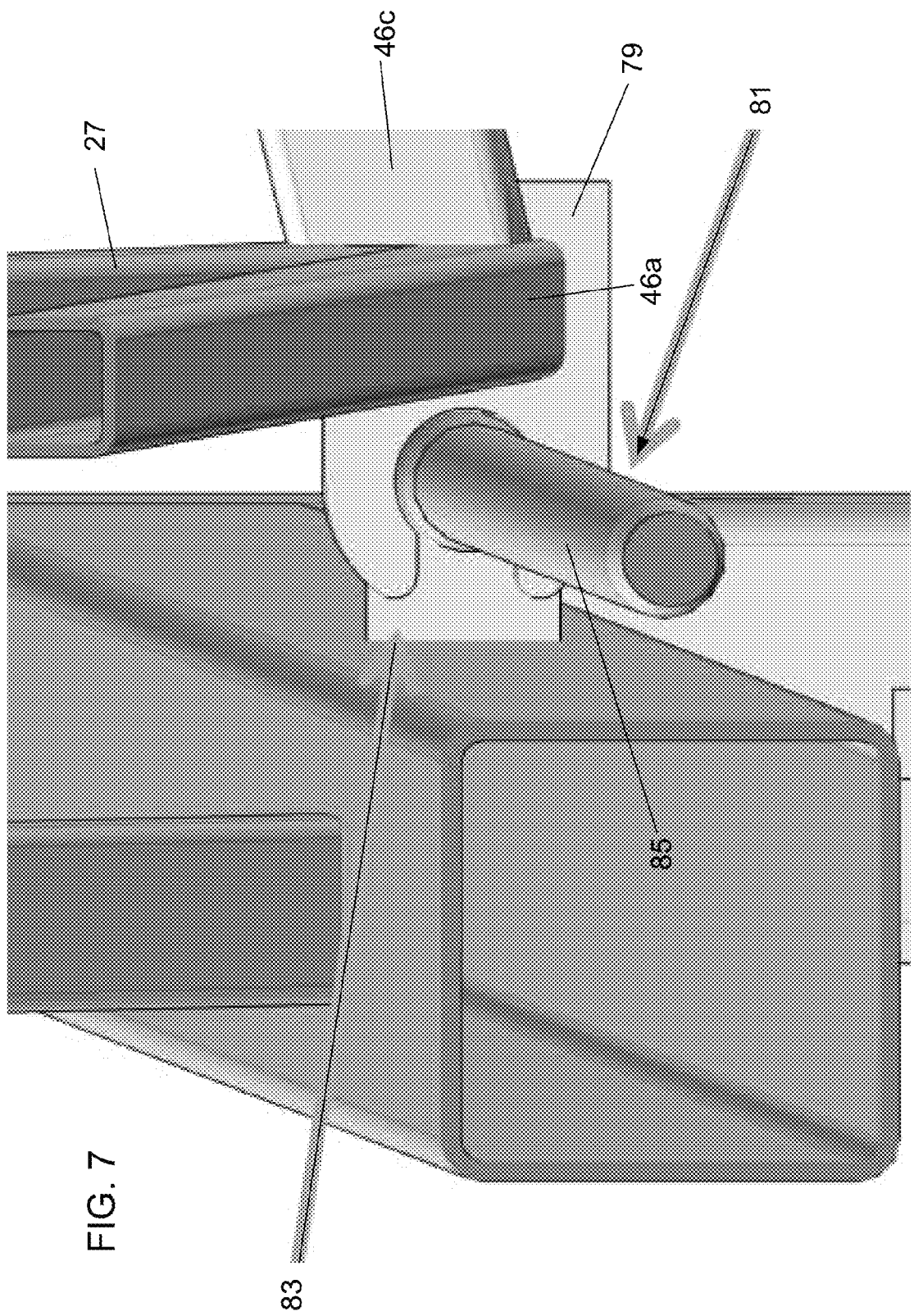
FIG. 7. Is a close up, and partially cross-sectional, view of the attachment of a slotted clevis 79 of a proximal part of a stringer to a rail 85 of the stringer.
Figure 8:
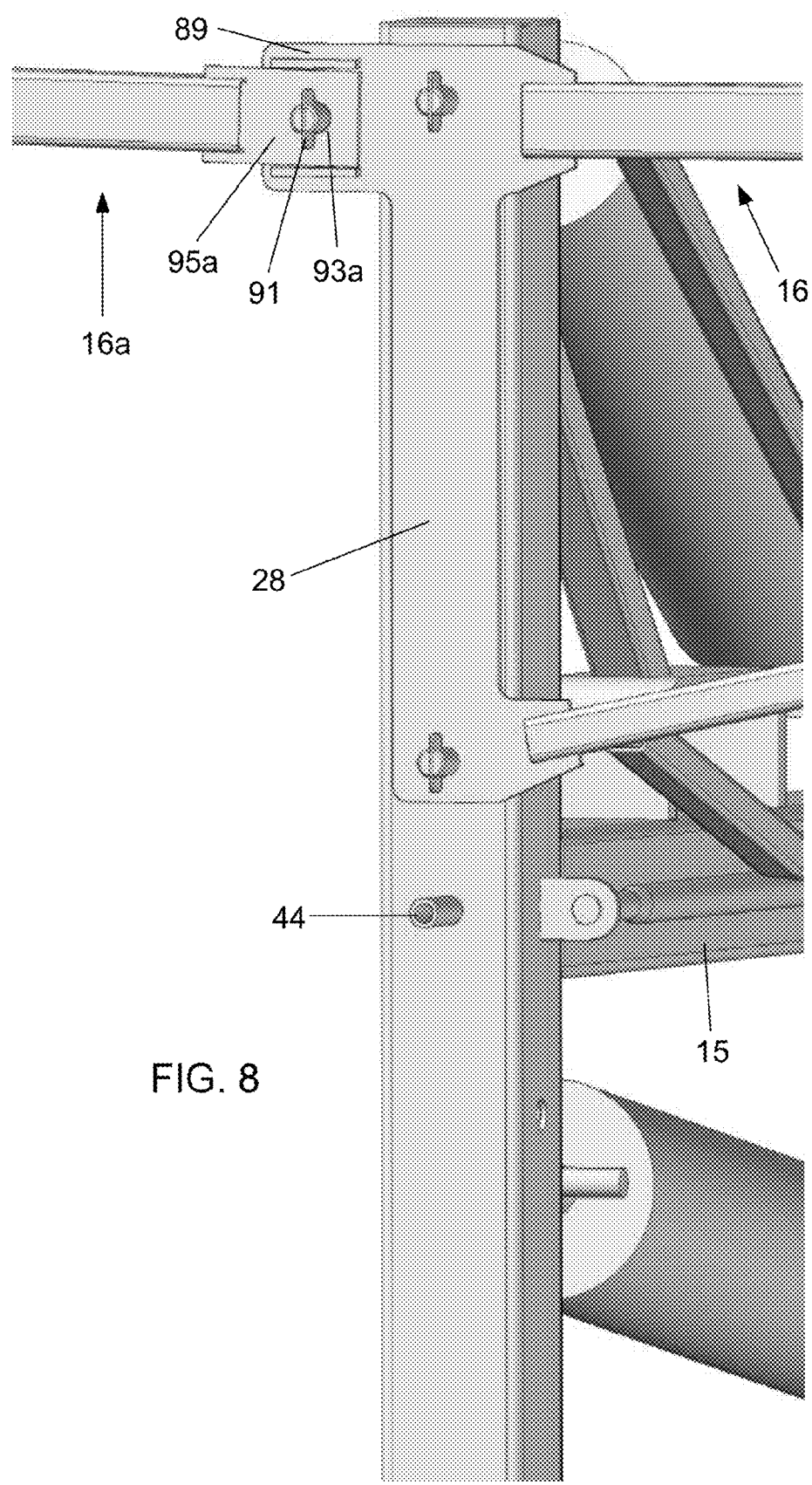
FIG. 8. Is a view of a walk side of one of the H-frames of FIG. 1 showing the attachment two stringers to each other end to end.

The vertical member 28 is formed with an upper hole 85 and a lower hole 87. The upper and lower holes 85 and 87 are dimensioned and spaced to receive anti-luce pins 75 and 77 respectively of upright 13. The upper end of the plate 28 is formed with a rearwardly extending heel portion 89. The heel portion 89 bears an outbye end, anti-luce attachment pin 91 for fastening through the hole 93 in the leading plate 95 of a preceding stringer 16. Above and below the outbye anti-luce attachment pin 91 are opposed swing limiting ridges 93 which are provided to abut the sides of the plate 95 to thereby prevent the preceding stringer from swinging through a greater than desired angular range about the attachment pin 91 while still allowing the stringer to slightly pivot up and down relative to H-frame 12 to allow for undulations in the ground surface FIGS. 5, 6 and 7 are various close ups showing the stringer 16 attached to the H-frame 12. FIG. 8 shows the attachment of the leading attachment plate 95a of a preceding stringer 16a to the heel 89 of stringer upright member 28. It will be observed that the anti-luce pin 91 has been passed through the hole 93a in the leading plate 95a of stringer 16a to thereby fasten the successive stringers 16a and 16 together.

It is preferred that the return rollers 24, or an idler set comprising the rollers 24, can be disconnected (dropped) from the transverse support stand by a disconnection mechanism. This may facilitate removal of the transverse support stand from between the upper (carry) and the lower (return) portions of the conveyor belt. This may assist in overcoming a disadvantage with existing structures which are more difficult to disassemble and remove from the belt conveyor apparatus.

Figure 9:
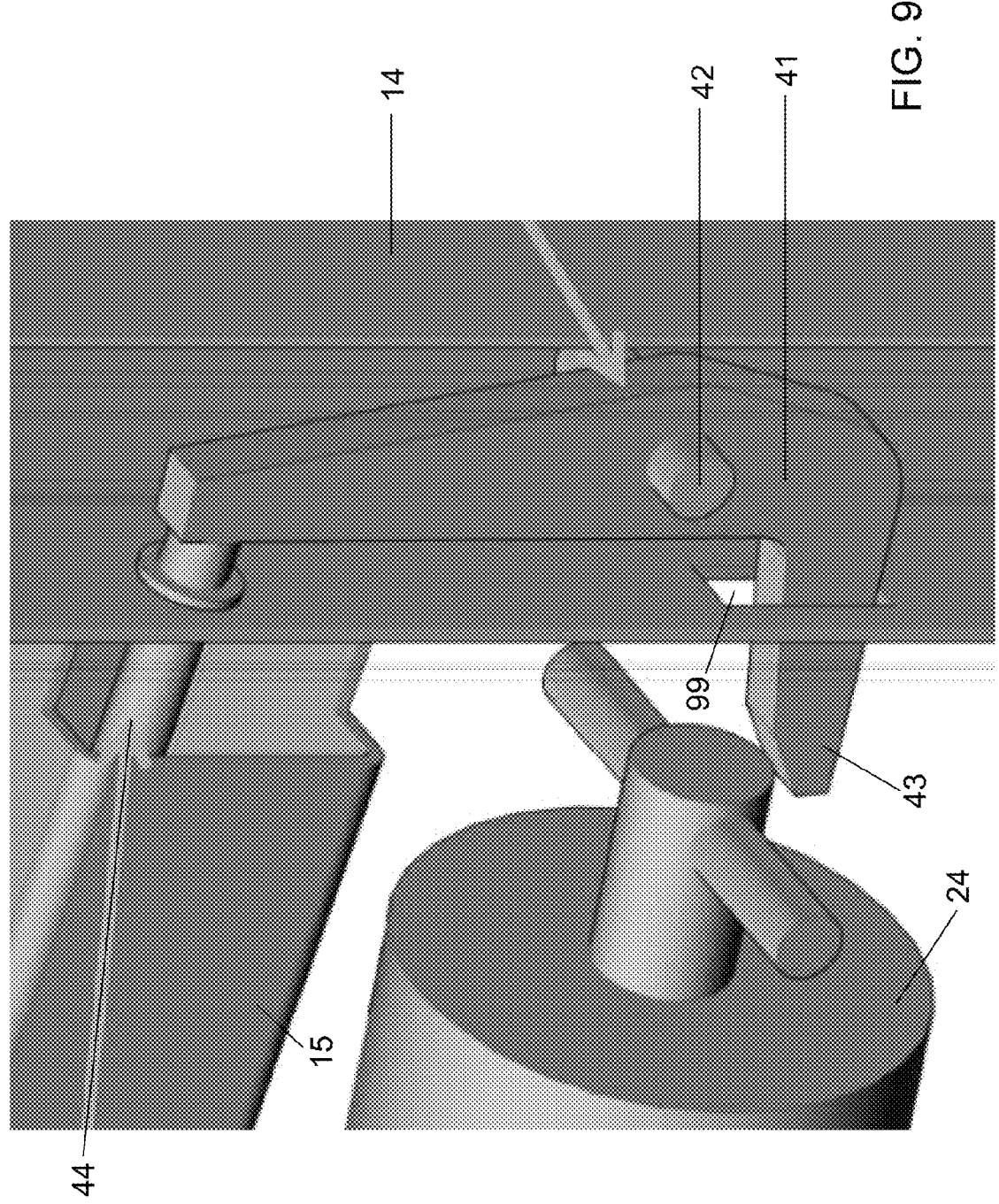
FIG. 9. Is a close up, cutaway view, of a non-walk side upright of an H-frame revealing a mechanism for disconnecting return rollers.

FIGS. 8 and 9 illustrate a preferred disconnection mechanism. The lower return idler set 24 is mounted to each frame 12 and particularly to the spaced apart leg members 13, 14 via an idler mounting arrangement as shown in FIG. 9A.

Adjacent the non-walk side idler mounting arrangement is a lifting hook which, in the particular embodiment shown in FIG. 9, comprises a bell crank 41 on the "non-walk side" leg member 14. The bell crank pivots about a mounting pin 42, and is located substantially within the interior of the respective leg member with only an end "finger" 43 extending through a small opening 99 in the side wall of the leg member.

To disconnect the return idler set from its mounting arrangement on the non-walk side of H-frame 12, a push rod 44 (see FIGS. 8 and 9) located within the cross member 15 is translated towards the non-walk side via actuation from the walk side of the H-frame. The translating motion rotates the bell crank 41 to pivot around its mounting pin 42, causing the exposed finger 43 of the bell crank to lift the non-walk side end of the return idler set 24 from the H-frame idler mounting arrangement so that it decouples from the H-frame 12.

Fit tolerances associated with the stringer's 16 inbye and outbye connections ensure the H-frame 12 achieves installation tolerances within acceptable industry levels. During installation, conveyor structure alignment can be achieved by ensuring a common datum point on the H-frame 12 aligns with a corresponding conveyor centreline.

FIGS. 10 to 14 illustrate an apparatus 57 according to a preferred embodiment of a further aspect of the present invention that is designed for handling transverse stands such as H-frames 12. The apparatus 57 comprises a powered system which is arranged for mounting to a mobile mining unit located at the belt conveyor and mobile mining unit interface. The apparatus 57 may be used to remove or insert an H-frame from a conveyor belt. The machine 57 largely eliminates the need for manual handling to recover or install an H-frame within the bounds of the conveyor belt strands.

Figure 10:
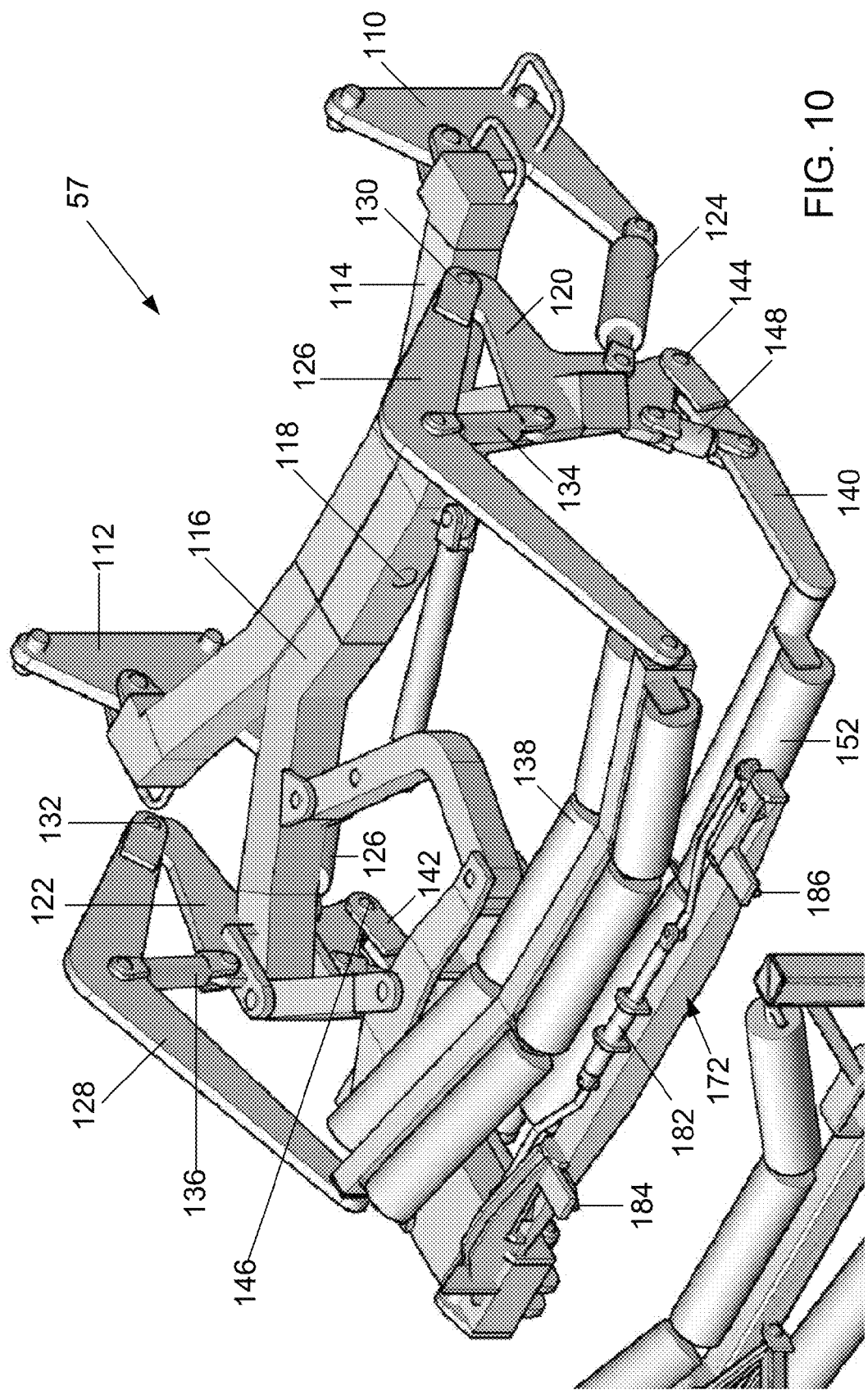
FIG. 10. Is a view of the top, front and non-walk side of an H-frame handling apparatus according to a preferred embodiment of the present invention.
Figure 11:
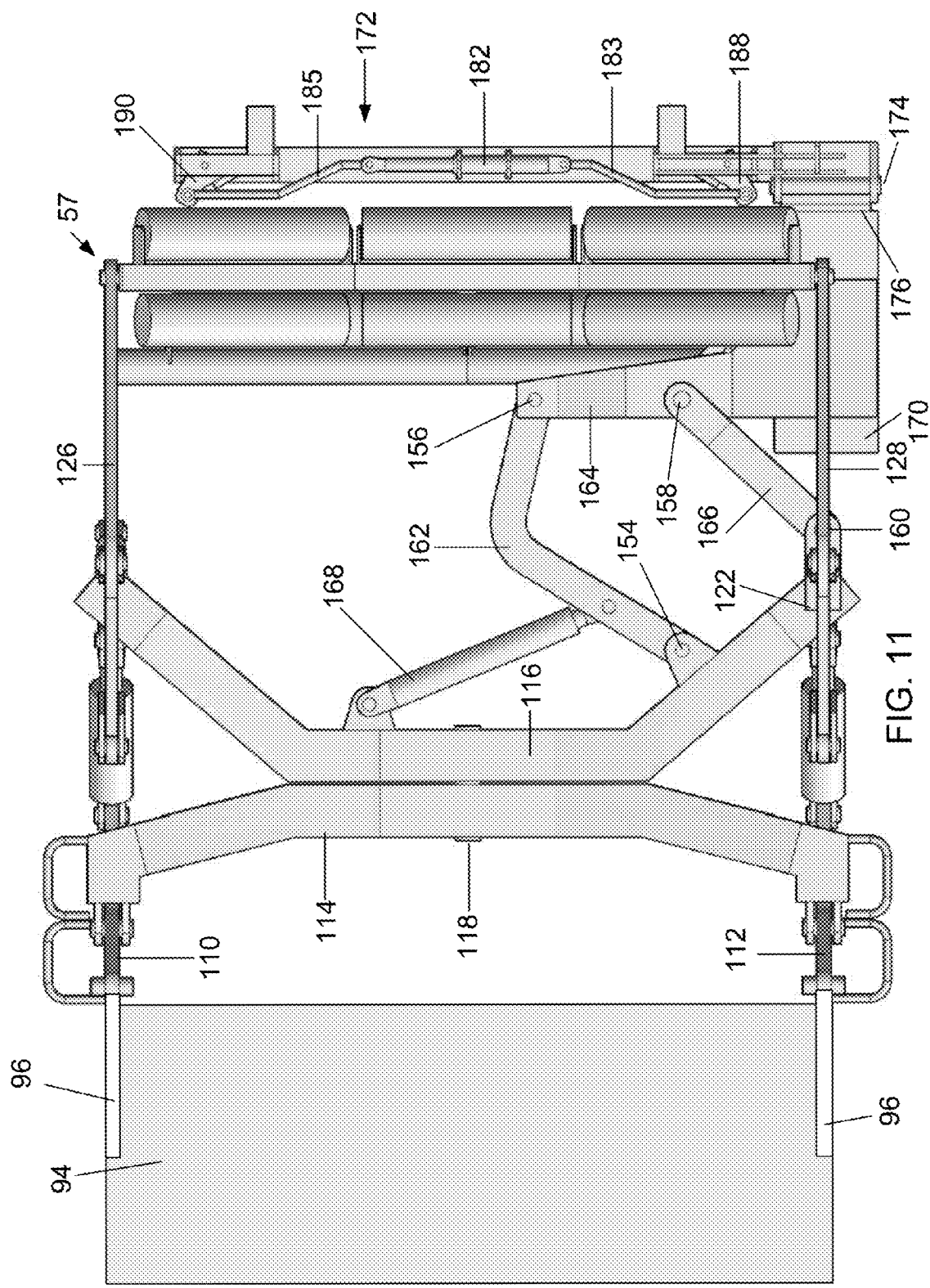
FIG. 11. Is a top plan view of the mechanism of FIG. 10.

Referring now to FIG. 10, at its rearward end the apparatus 57 includes vehicle mounting plates 110, 112 for attachment to a mobile unit. FIG. 11 is a top plan view of the apparatus 57 attached to the mobile unit 94 by means of attachment members 96. A mounting plate spacing bar 114 spans between the vehicle mounting plates 110 and 112. A roll bar 116 is coupled, by means of pivot 118, to the mounting plate spacing bar 114. Opposite ends of roll bar 116 are mounted fast with lever arm plates 120, 122. Hydraulic ram actuators 124, 126 are disposed between vehicle mounting plates 110, 112 and lever arm plates 120, 122. Accordingly, by independently operating the actuators 124, 126 the roll bar 116 may be made to roll through a limited range about the pivot 118. This limited roll may be desirable to compensate for the case where the vehicle supporting apparatus 57 is located on uneven ground.

The lever arm plates 120 and 122 respectively support third order, boomerang shaped, upper lever arms 126 and 128. Rearward ends of the upper lever arms 126, 128 are connected by pivots 130, 132 to rearward ends of lever arm plates 120 and 122 respectively. Hydraulic upper roller lifting rams 134, 136 are coupled between the lever arm plates and an internal angle of the upper lever arms 126, 128 respectively. Conveyor carry belt lifting means, in the form of rollers 138, are disposed between the forward ends of the lever arms 126, 128. Accordingly, it will be realized that by operating the hydraulic rams 134, 136 it is possible to raise and lower the carry belt rollers 138 to a desired height.

The hydraulic rams of the apparatus 57 are connected via hydraulic lines to a source of hydraulic power in the conventional way. A control unit including control levers and associated hydraulic circuit components is provided for an operator to control the various actuators of the apparatus 57 as desired and in particular in the manner that will subsequently be described with reference to FIGS. 17 to 24, for example.

The lever arm plates 120 and 122 are coupled to third order lower lever arms 140 and 142 (visible in FIG. 12) by pivots 144 and 146 respectively. Hydraulic rams 148 and 150 are connected between the lever arm plates 120, 122 and the lower lever arms 140 and 142. Conveyor return belt lifting means in the form of rollers 152 are disposed between the forward ends of the lower lever arms 140, 142. Accordingly, by operating rams 148, 150 it is possible to raise and lower the return belt rollers 152.

Figure 12:
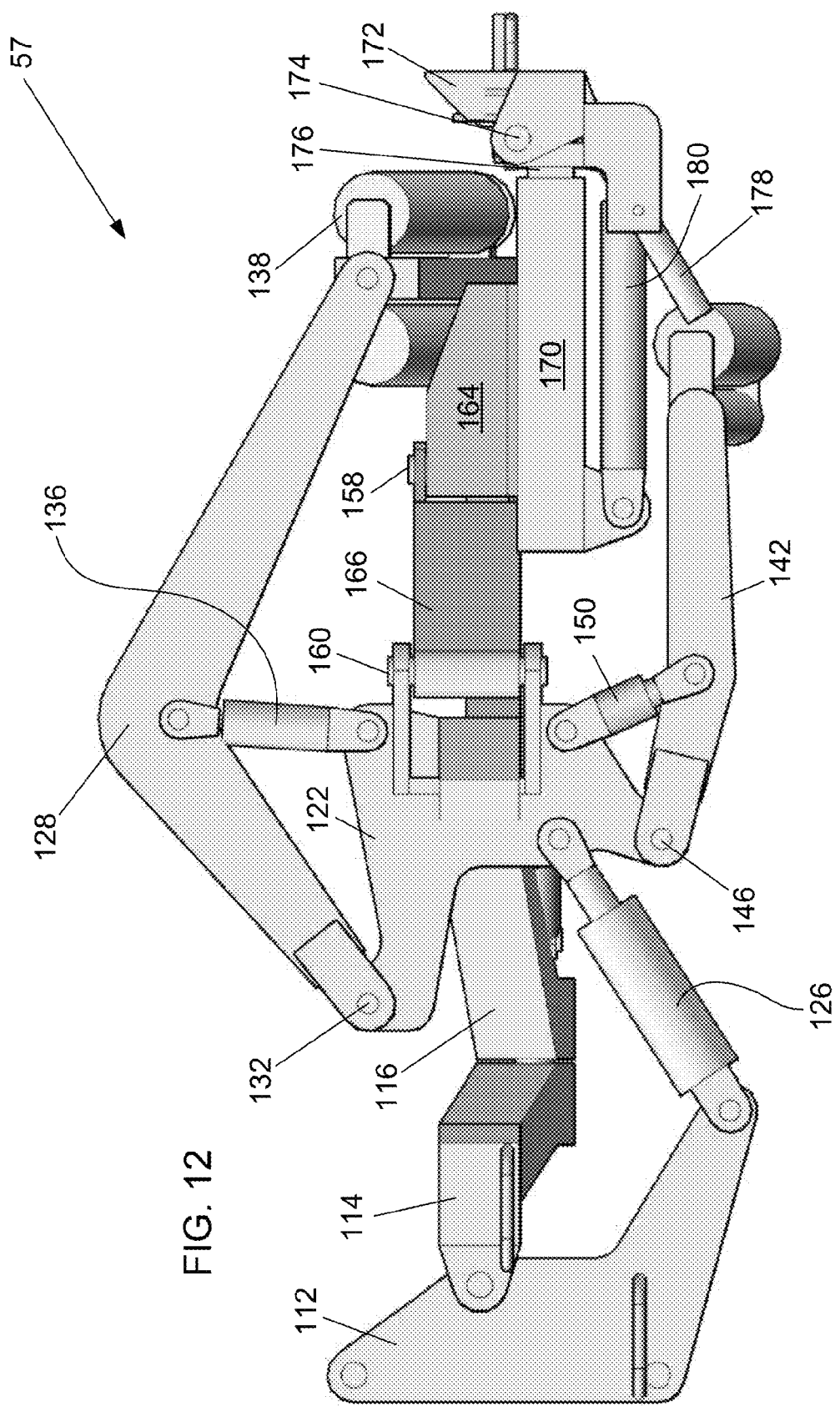
FIG. 12. Is a walk side view of the mechanism of FIG. 10.
Figure 13:
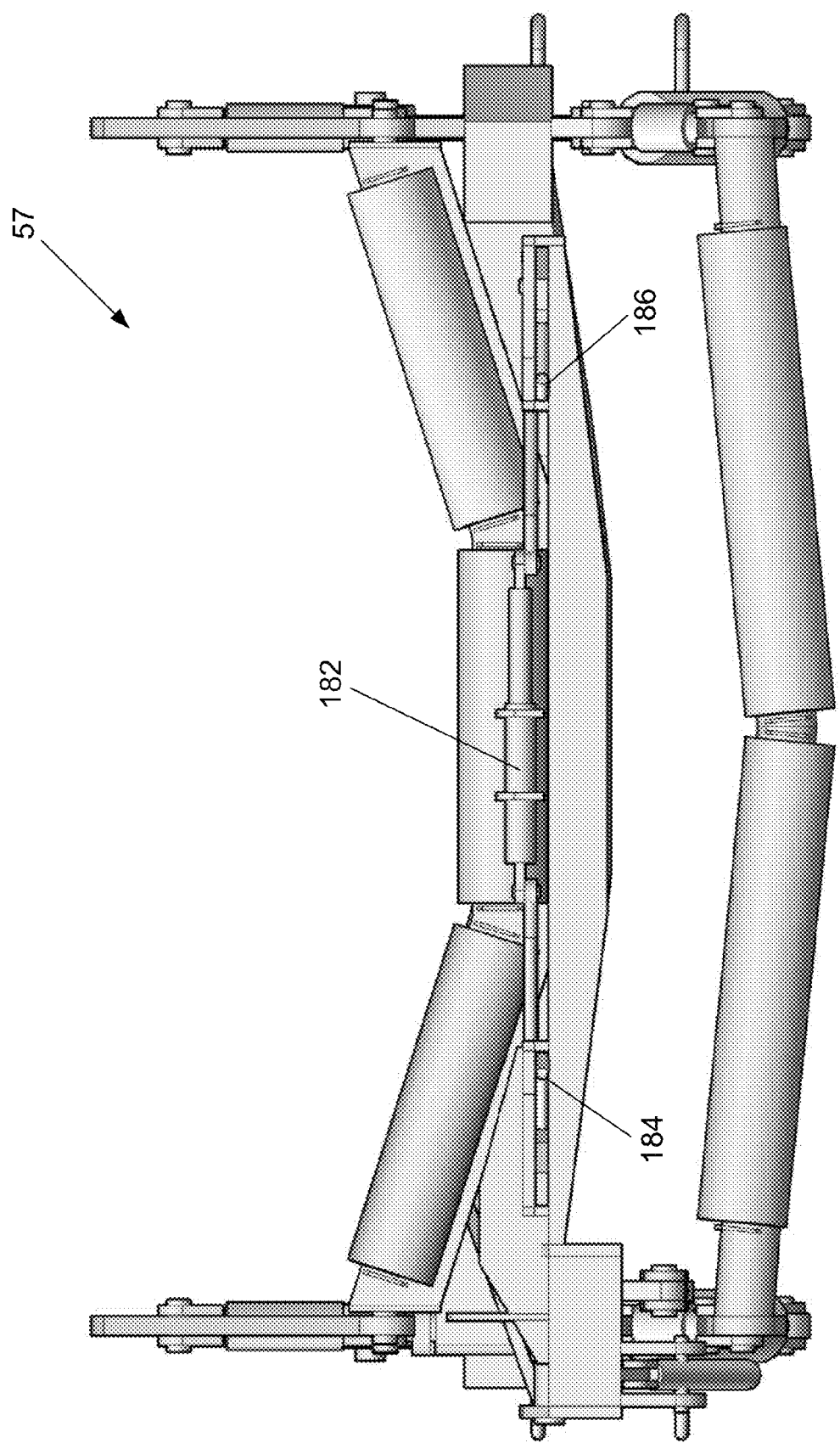
FIG. 13. Is a view of the front of the mechanism of FIG. 10.
Figure 14:
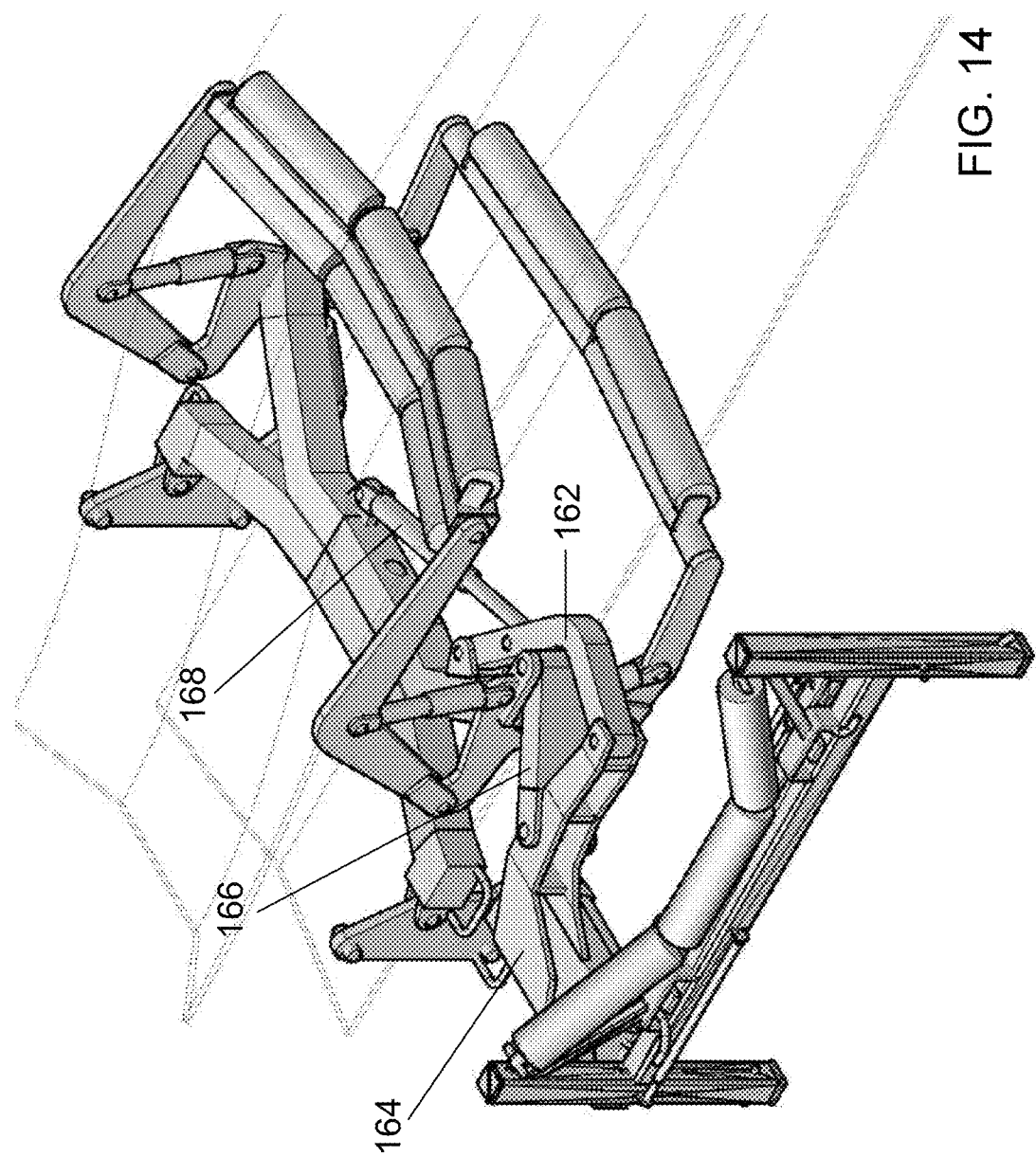
FIG. 14. Is a front, topside and walk side view of the mechanism of FIG. 10 wherein an actuator for a four bar linkage of the mechanism has been operated.

Referring now to FIGS. 11 to 13, and initially to FIG. 11 it will be observed that a planar four bar linkage is provided. The four bar linkage includes pivots 154, 156, which connect angle arm 162 to roll bar 116 and boom arm 164 respectively. The four bar linkage further includes pivots 158 and 160 which connect straight arm 166 to boom arm 164 and a forward extremity of lever plate 122, which is fast with roll bar 116. A hydraulic four bar linkage actuator 168 is mounted diagonally between the roll bar 116 and a point along the angle arm 162 of the four bar linkage. Accordingly, by extending the four bar linkage actuator 168 from the retracted configuration shown in FIG. 11 to the extended configuration as shown in FIG. 14, the boom arm 164 can be rotated and translated out and away to the side of the apparatus as shown in FIG. 14.

Referring again to FIG. 11 and also to FIG. 12, a grab and tilt arm 172 extends along the front side of the apparatus 57. One end of the grab and tilt arm 172 is mounted, by means of tilt pivot 174 to a retractable slide arm 176. An end of the retractable slide arm 176 opposite pivot 174 is received into a compartment 170 that is mounted beneath the boom arm 164 so that the retractable slide arm can slide rearward and forward relative to the compartment 170. A tilt actuator 178 is provided to tilt the grab and tilt arm anti clockwise (with reference to FIG. 12) about the pivot 174 from the vertical position shown in FIG. 12 to a horizontal position. A slide actuator 180 is also provided for retracing and extending the slide arm 176 to and from the compartment 170.

Figure 15:
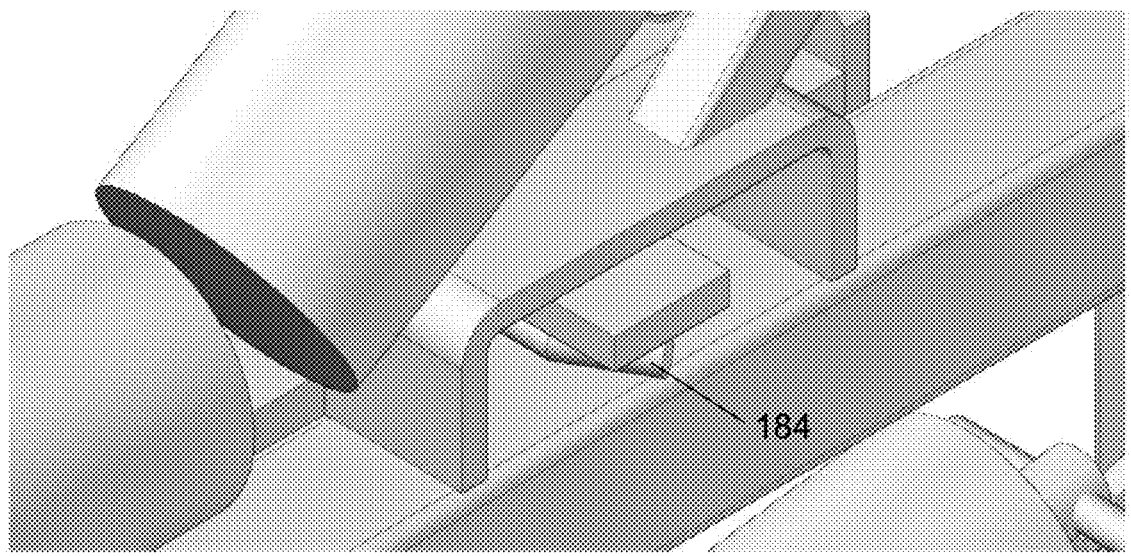
FIG. 15. Is a close up view showing a gripping hook of the apparatus of FIG. 10 prior to its engagement with a bracket of an H-frame.
Figure 16:
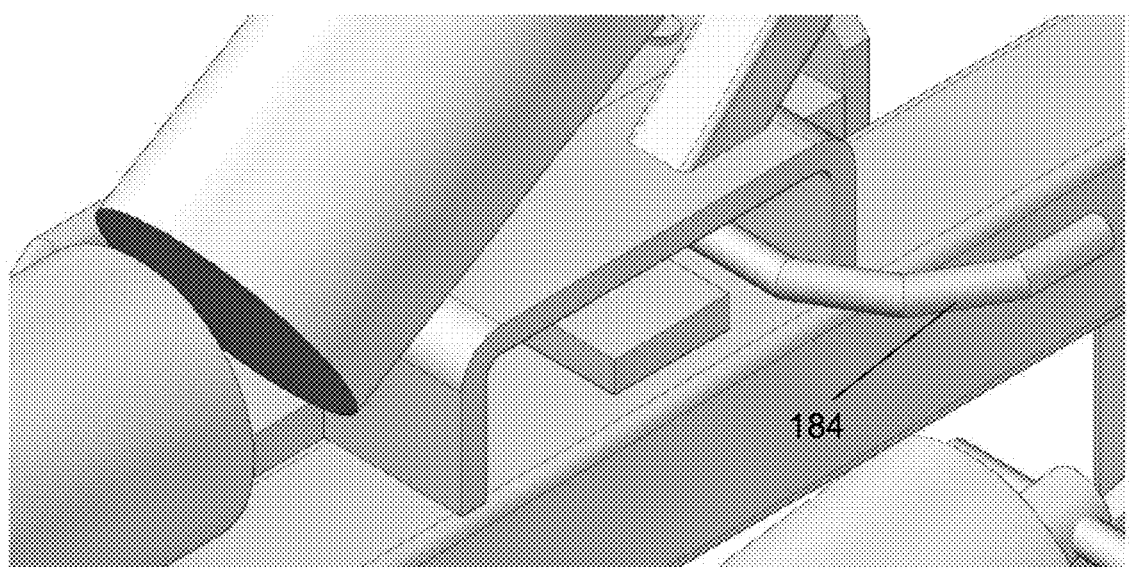
FIG. 16. Is a close up view showing the gripping hook of FIG. 10 subsequent to its engagement of the bracket of the H-frame.

As can be seen in FIG. 11, a grip actuator 182 is mounted to the top side of the grab and tilt arm 172. Either ends of the actuator are free to move and are coupled by rods 183 and 185 to grippers in the form of hooks 184, 186 (hook 184 is best seen in close up in FIGS. 15 and 16) by hook pivot plates 188 and 190. It will be realised that other types of grippers might be used instead of the mechanical hooks. For example, in some embodiments electromagnets might be used instead. Consequently, by operating the hydraulic grip actuator 182 it is possible to bring both hooks from the retracted position show in FIG. 15 to an H-frame engagement position as shown in FIG. 16. In the H-frame engagement position it is intended that the hooks 184 and 186 grip the H-frame handling brackets 105 (visible in FIG. 3).

Figure 17:
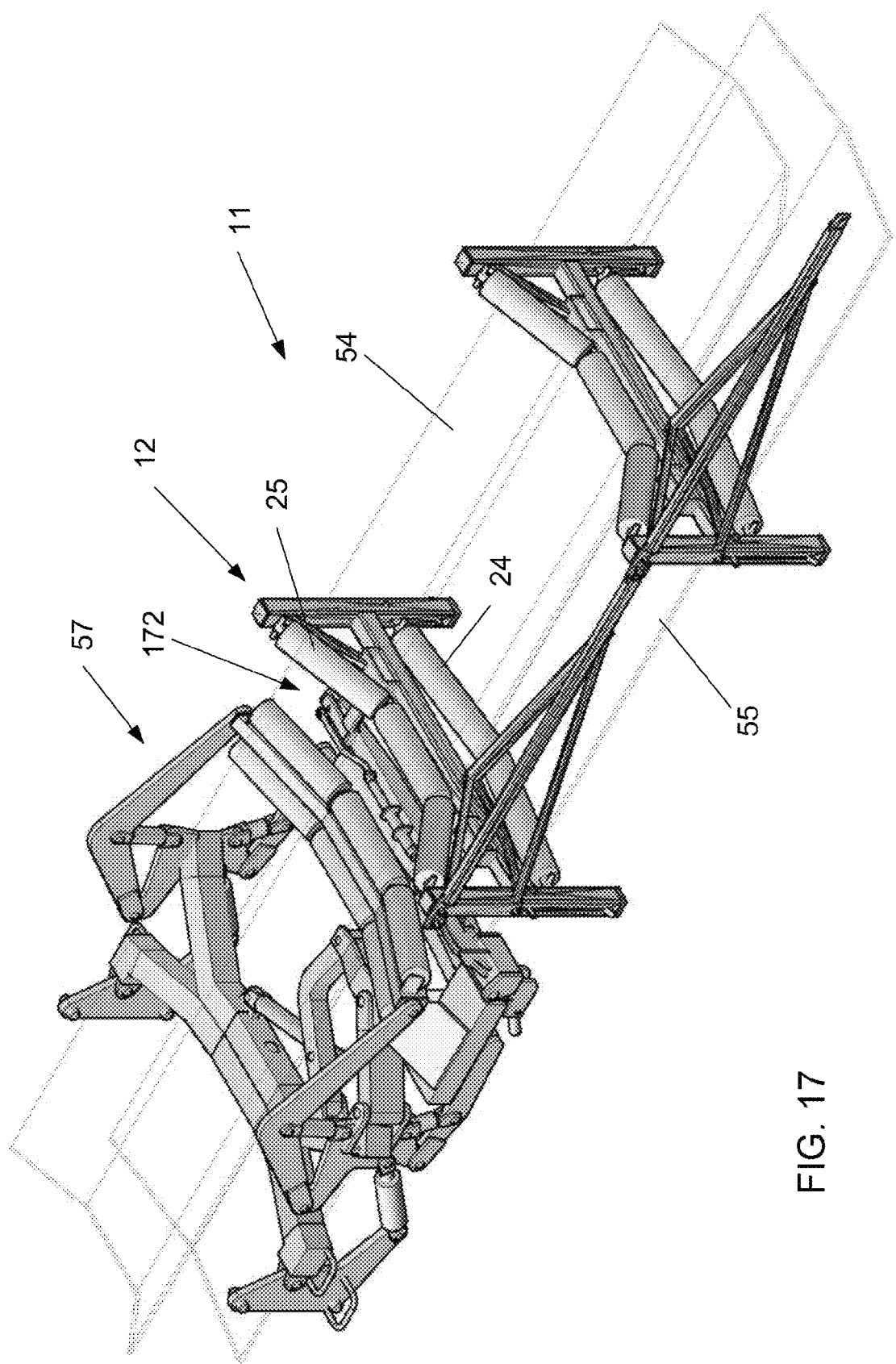
FIGS. 17 to 24. Illustrate a sequence of steps in the operation of the mechanism of FIG. 10 to handle an H-frame in order to remove it from a conveyor.

Reference will now be made to a method comprising a set of steps that can be followed to remove an H-frame and stringer from the conveyor belt. The sequential steps are illustrated in FIGS. 17-24. The home position for the stand handling apparatus 57 is as shown in FIG. 17. The apparatus 57 is permanently located between the carry and return belts when it is not being used, i.e. when the belt is running and the stands are not being handled by the apparatus 57.

Figure 18:
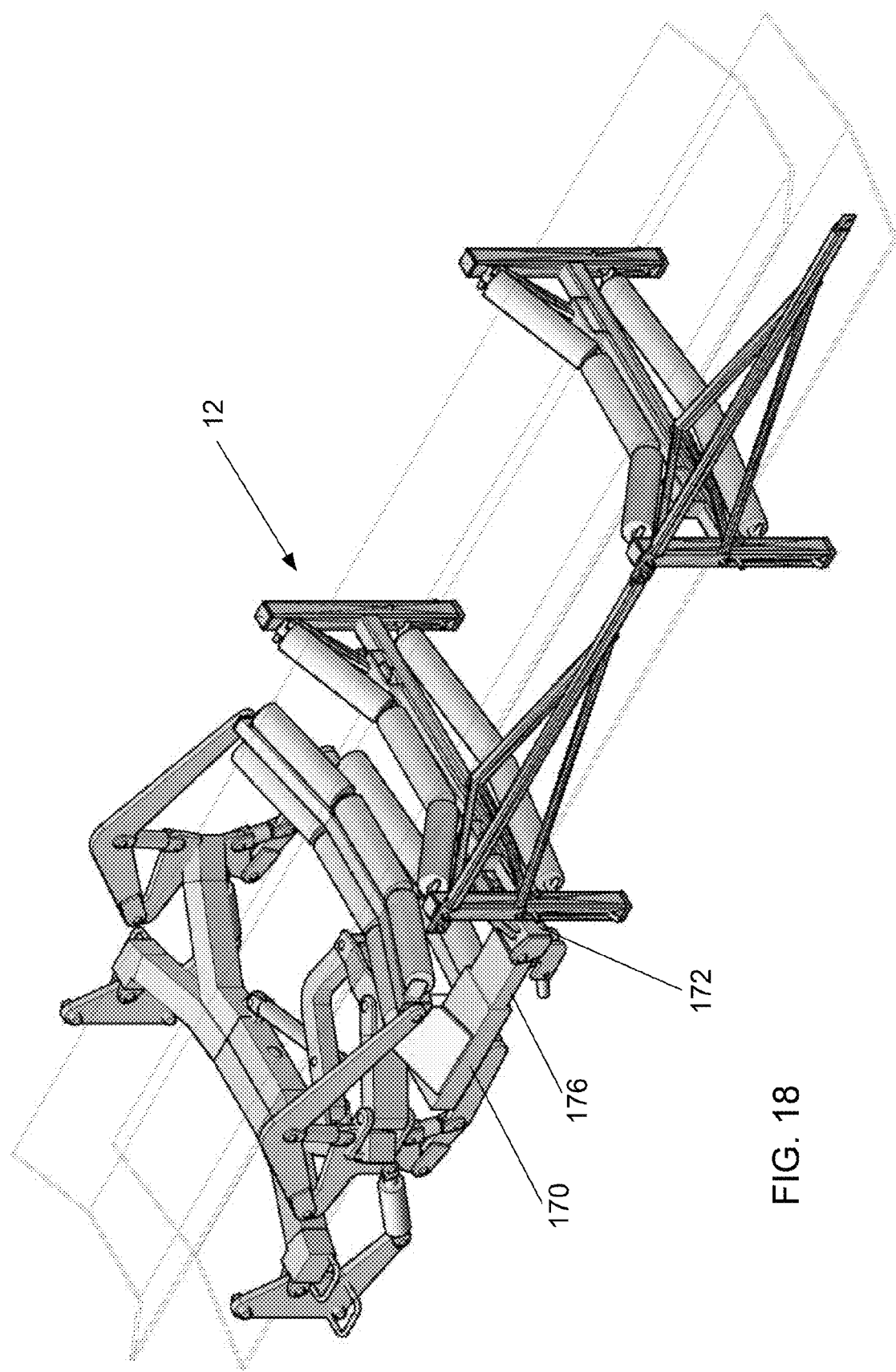
Figure 19:
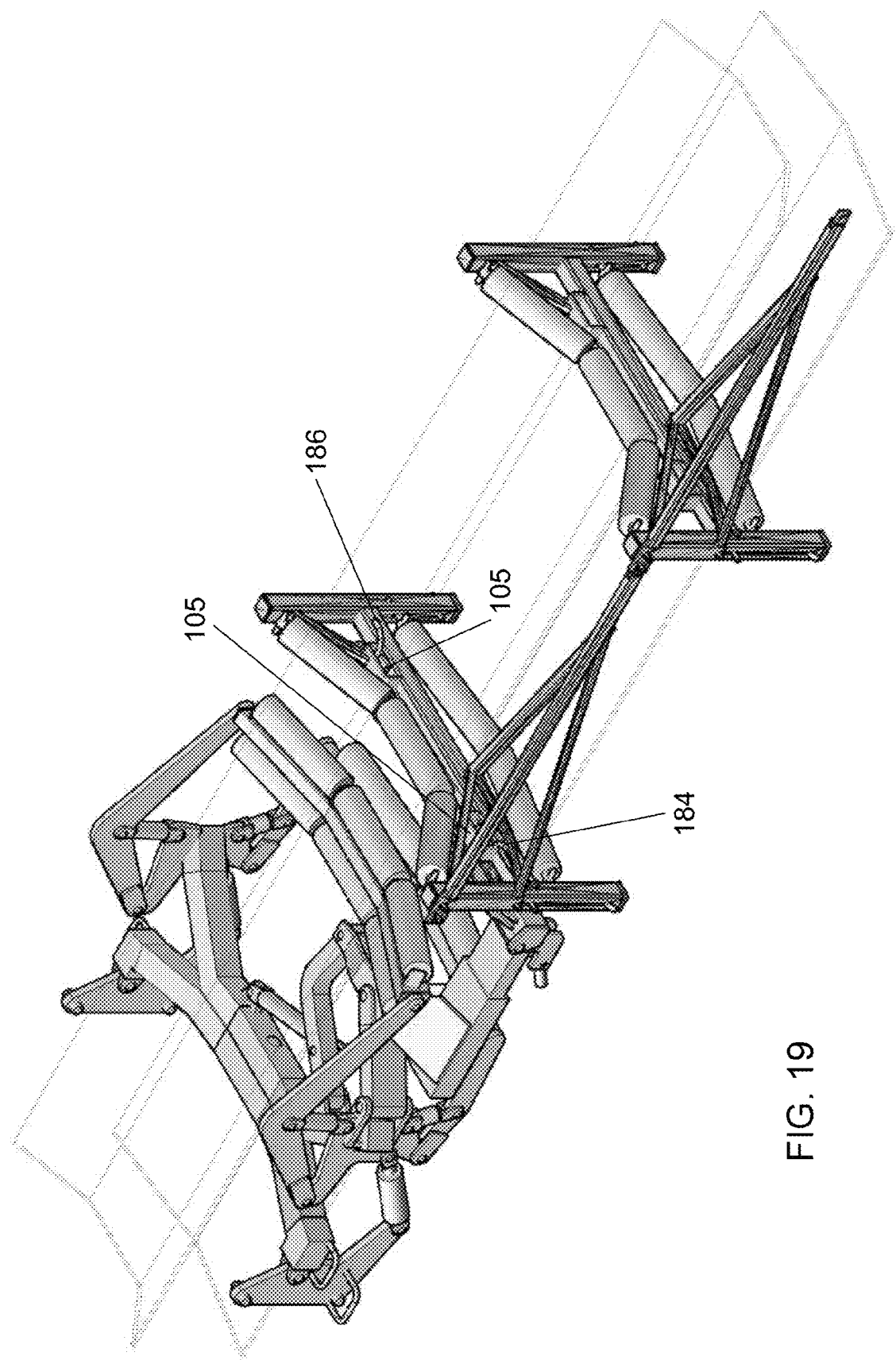

Initially, as shown in FIG. 17, the H-frame handling apparatus 57 is brought up so that its leading grip and tilt arm 172 is adjacent the rearward side of an H-frame 12. In this configuration the carry conveyor belt 54 is supported by the upper rollers 25 of the H-frame. The next step, which is shown in FIG. 18, involves operation of the slide actuator 180 so that the slide arm 176 is brought out from the compartment 170 to the extended position shown in FIG. 18. As the slide arm 176 is extended it brings the attached grip and tilt arm 172 forward with it so that the grip and tilt arm 172 is brought into abutment, or at least very close, to the rearward side of the H-frame 12. The next step is that the grip actuator 182 is then operated to cause the grip hooks 184 and 186 to pivot out and engage H-frame handling brackets 105 as shown in FIG. 19.

Figure 20:
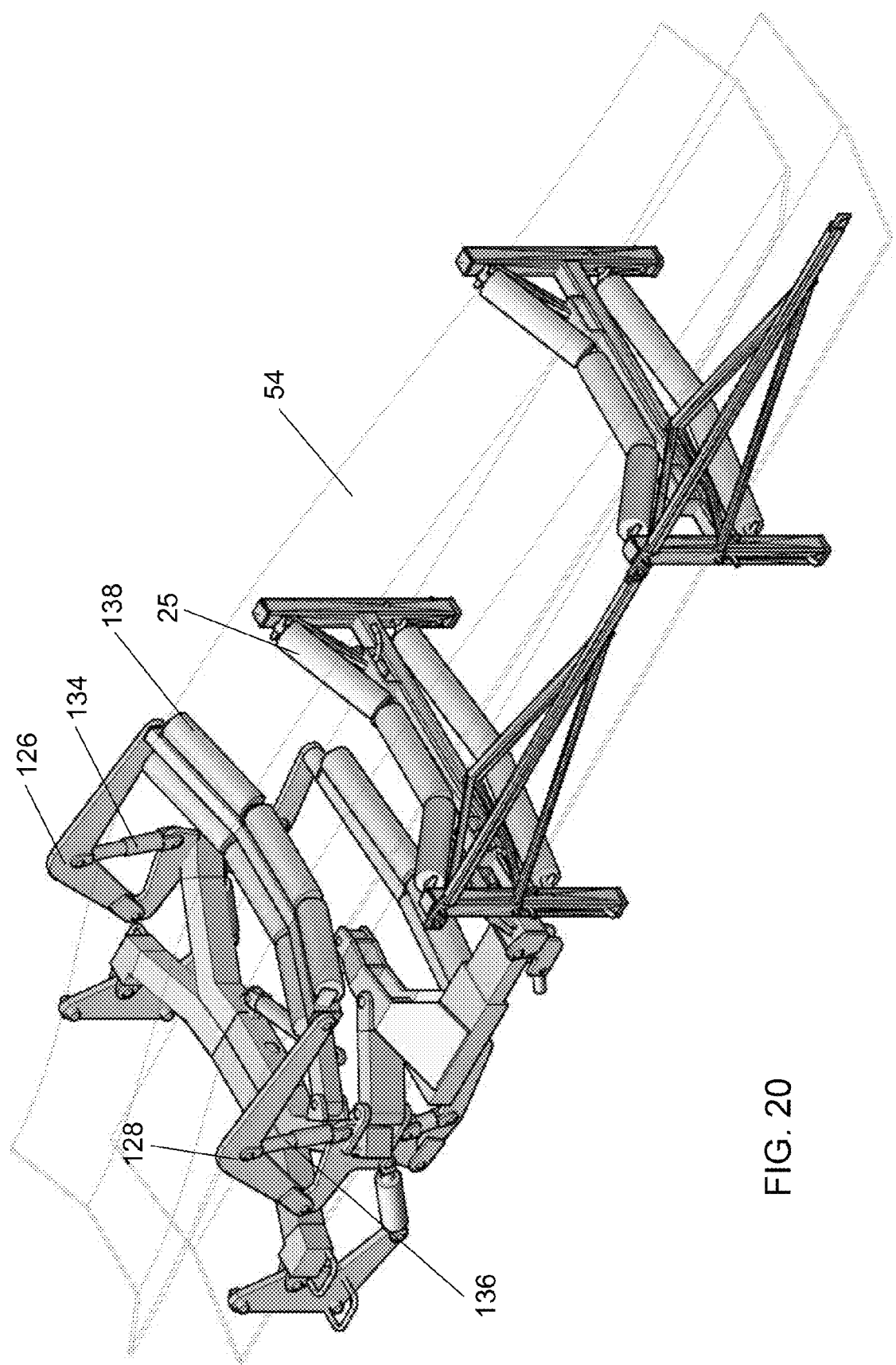
Figure 21:
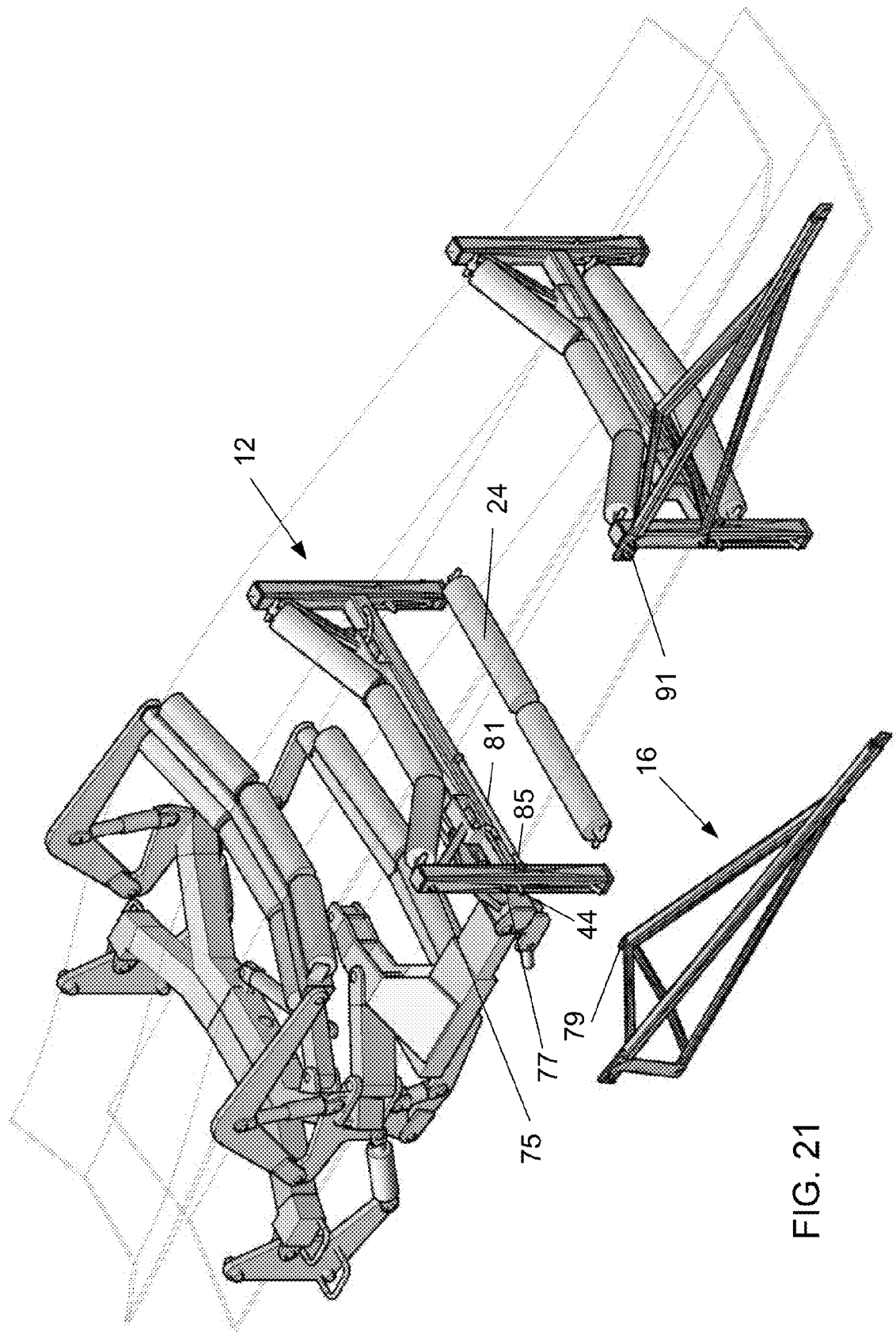

As illustrated in FIG. 20, the next step is that upper roller lifting rams 134, 136 are extended to thereby pivot upper lever arms 128, 126 upward so that the upper rollers 138 are raised thereby lifting the conveyor carry belt 54 clear of the upper H-frame rollers 25.

Now that the conveyor carry belt 54 has been lifted clear of the upper H-frame rollers 25 by the upper rollers 138 of the handling apparatus 54 and the H-frame 12 is being firmly gripped, it is possible to dismantle the bay. Dismantling the bay 11 involves detaching the stringer 16 from the H-frame 12 and dropping the lower rollers 24 from the frame. Detaching the stringer involves bringing the anti-luce pins 75, 77 of the H-frame 12 to their non-locking positions and similarly unlocking the anti-luce pin 91 of the next stringer along. Once the anti-luce pins 75, 77 and 91 have been unlocked the slotted clevis 79 of the stringer can be slid along rail 81 until it reaches the necked portion 85 of the rail at which position it can be detached. Detaching the lower rollers 24 from the H-frame 12 involves pushing the rod 44 as previously discussed.

The detached stringer 16 and lower rollers 24 of the H-frame are now manually moved away from the conveyor.

Figure 22:
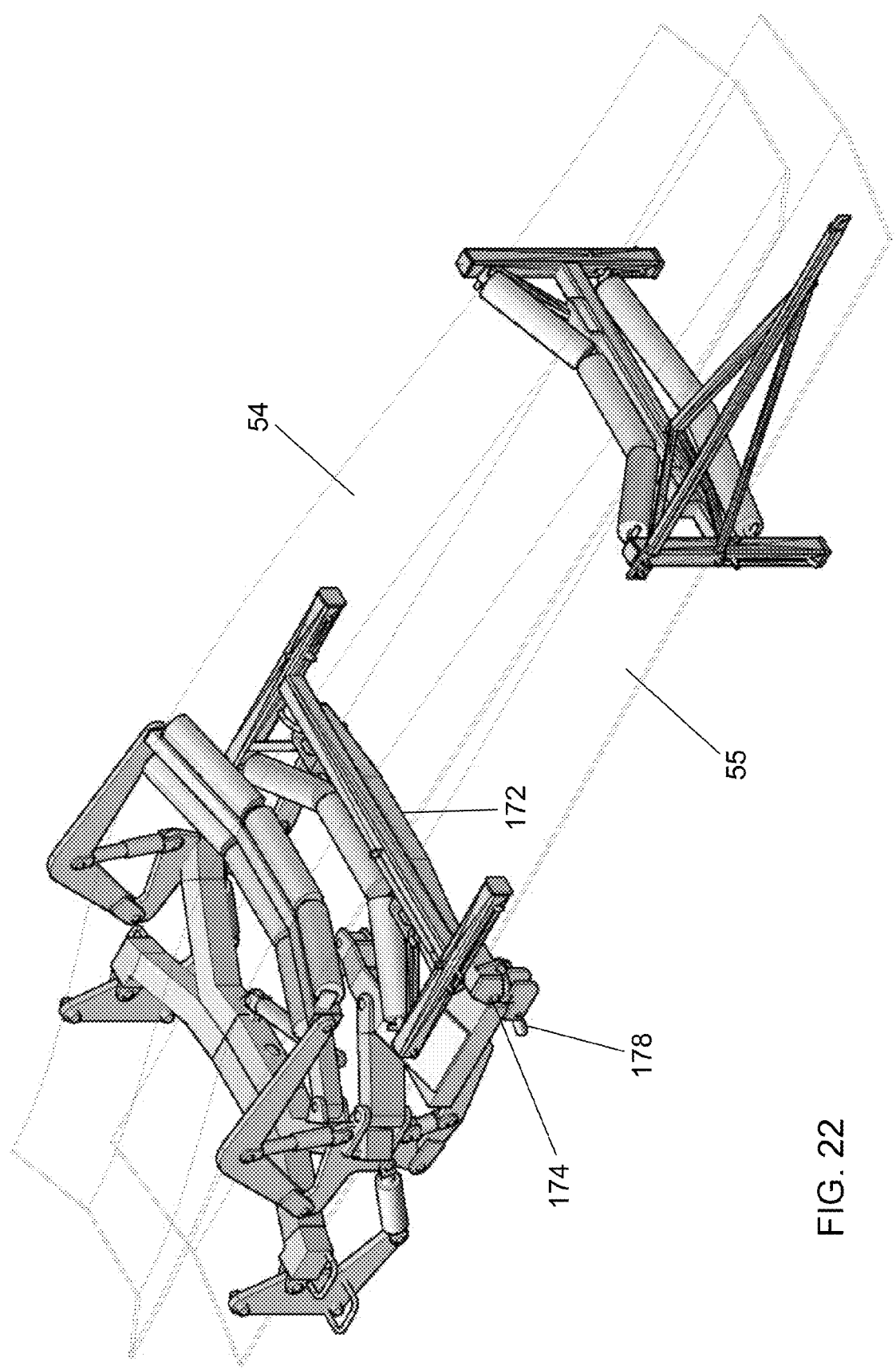
Figure 23:
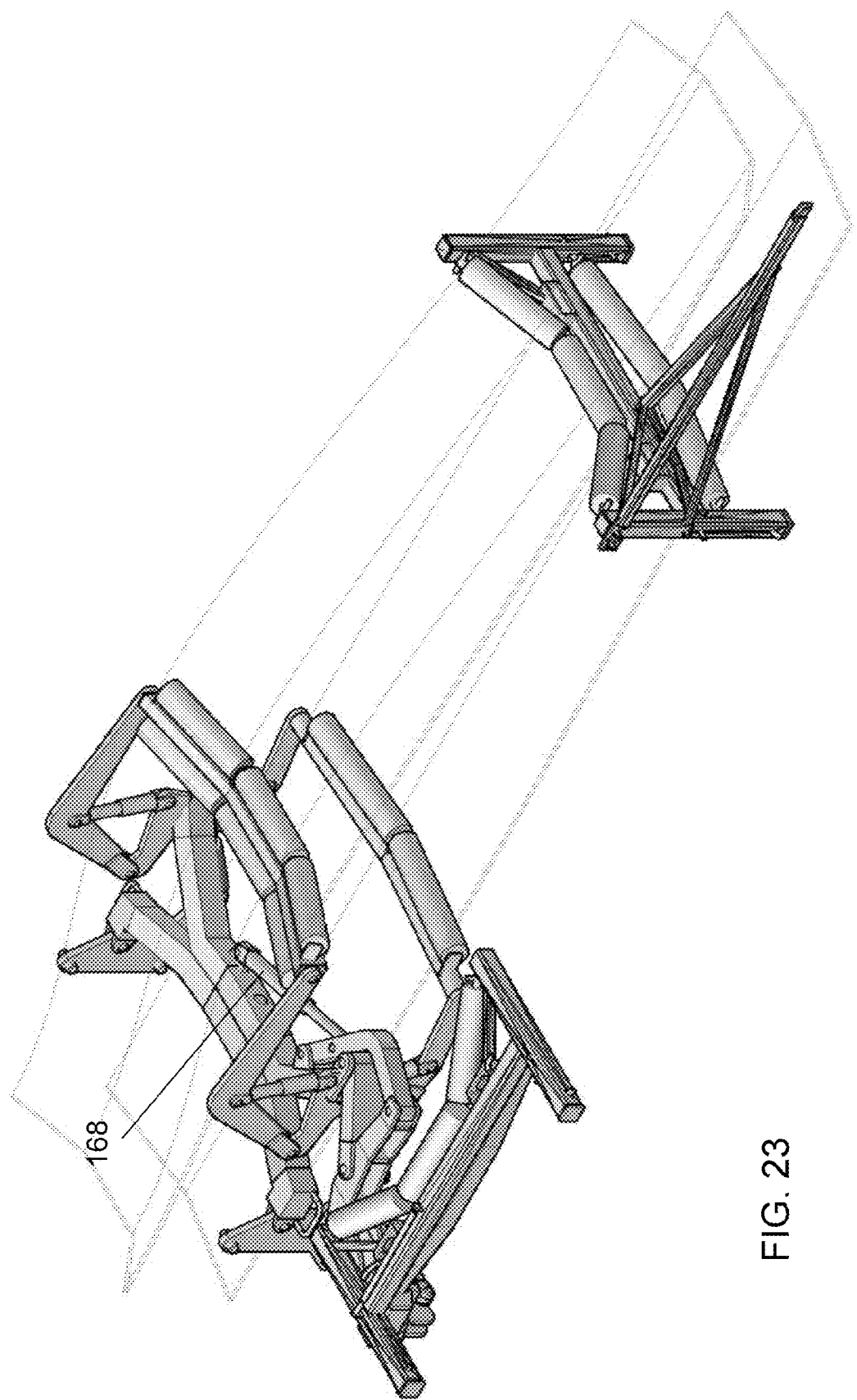
Figure 24:
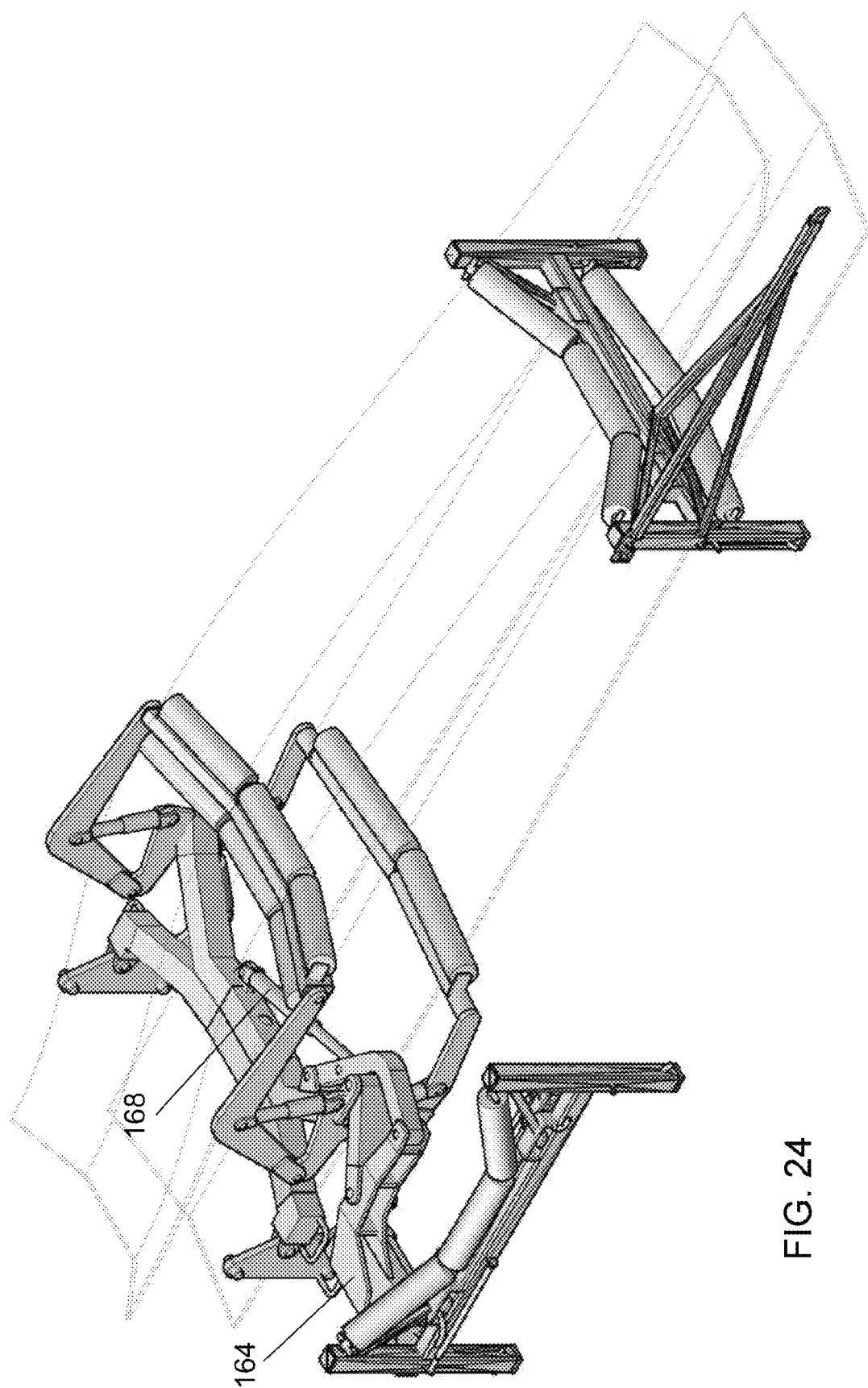

The tilt actuator 178 is then operated so that the grip and tilt arm 172 tilts back through ninety degrees about pivot 174 to assume the position shown in FIG. 22. In this position the H-frame lies horizontally between the upper conveyor carry belt 54 and the lower conveyor return belt 55. The four bar linkage actuator 168 is then operated to swing the boom arm 164 and hence also the grip and tilt arm 172 and so the H-frame 12, while in the horizontal position, out of the confines of the belt and into the walk way as shown in FIG. 23. Once in the walkway the H-frame 12 is tilted back to the generally vertical position shown in FIG. 24. The gripping hooks 184 and 186 are then retracted so that the H-frame can be readily removed from the site.

FIGS. 25 to 29 illustrate a further, less preferred, embodiment of the invention and particularly describe a variation to the design of the H frame and the stringer.

Figure 25:
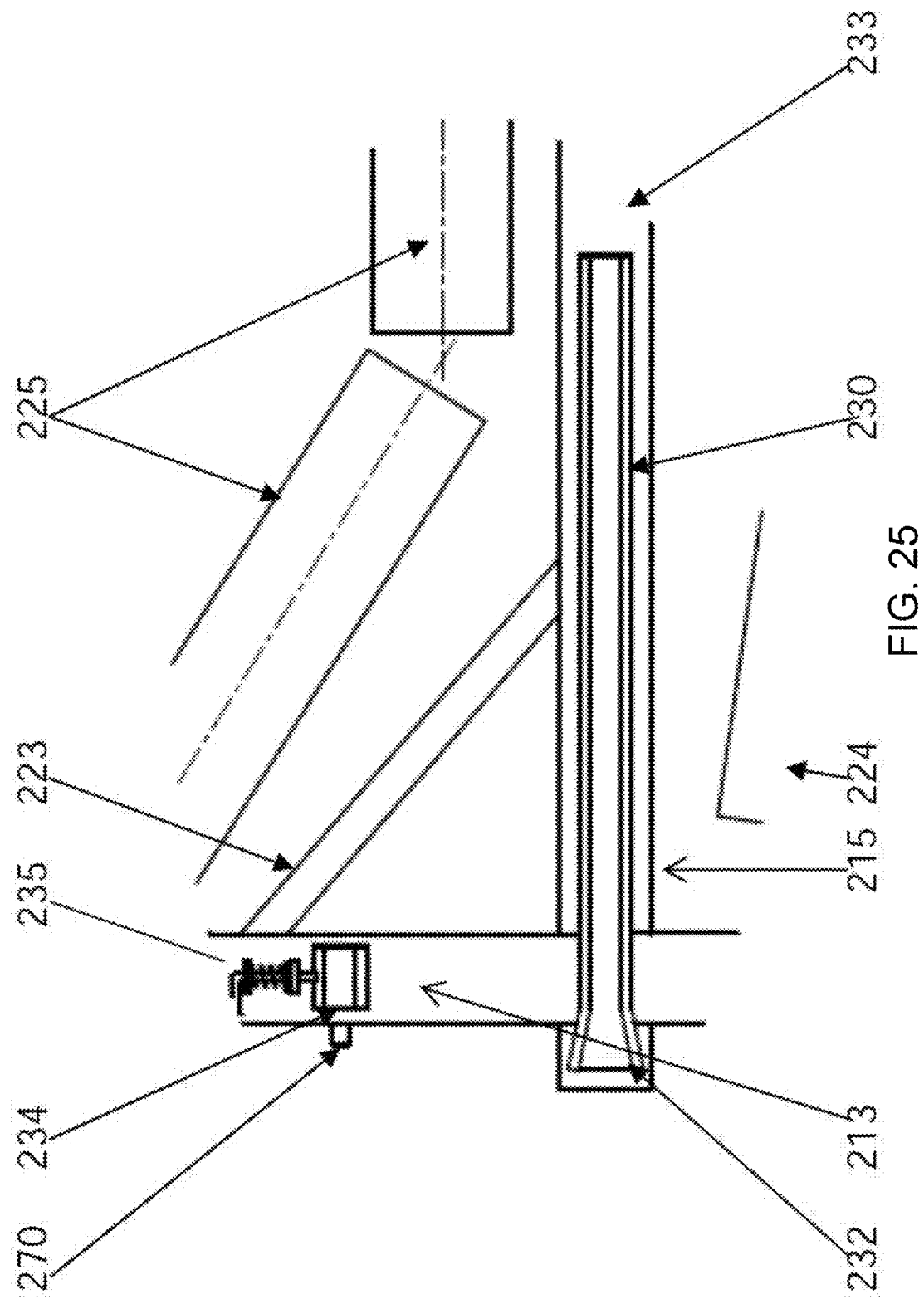
FIG. 25. Is a close up of part of the transverse support stand illustrating the channels to enable the proximal end of the stringer to attach to the stand.

Referring specifically to FIGS. 25-28 and initially to FIG. 25 there is shown part of H frame. The illustrated part of the H frame includes a vertical leg member 213 and a cross member 215. Some of the carry idler set 225 is illustrated. A small part of the lower return idler set 224 is also illustrated. FIG. 25 also illustrates a bracing strut 223.

Attached to and extending along cross member 233 is a channel member 230. Channel member 230 in the particular embodiment is a separate piece which is attached by any suitable means to cross member 233. FIG. 27 illustrates an end view of channel member 230 to illustrate that it is substantially C shaped and contains inwardly extending portions 231 to define a slot. Referring back to FIG. 25, channel member 230 has an open entry end 232 which is slightly flared to assist in insertion of a projection (described in greater detail below), and a closed other end which prevents the projection from sliding out of channel member 230 through the other end.

The H frame additionally contains a smaller second channel member 234 which is best illustrated in FIG. 25 and FIG. 27 and which again comprises a substantially C shaped body containing inwardly extending portions to define a slot similar to or the same as that of channel member 230. However, the second channel member 234 is attached to leg member 213 and above channel member 230 and only extends substantially across leg member 213.

A locking means is provided which, in the particular embodiment, comprises a spring biased locking pin 235 which is illustrated at least in FIG. 25, FIG. 27 and FIG. 28.

Figure 26:
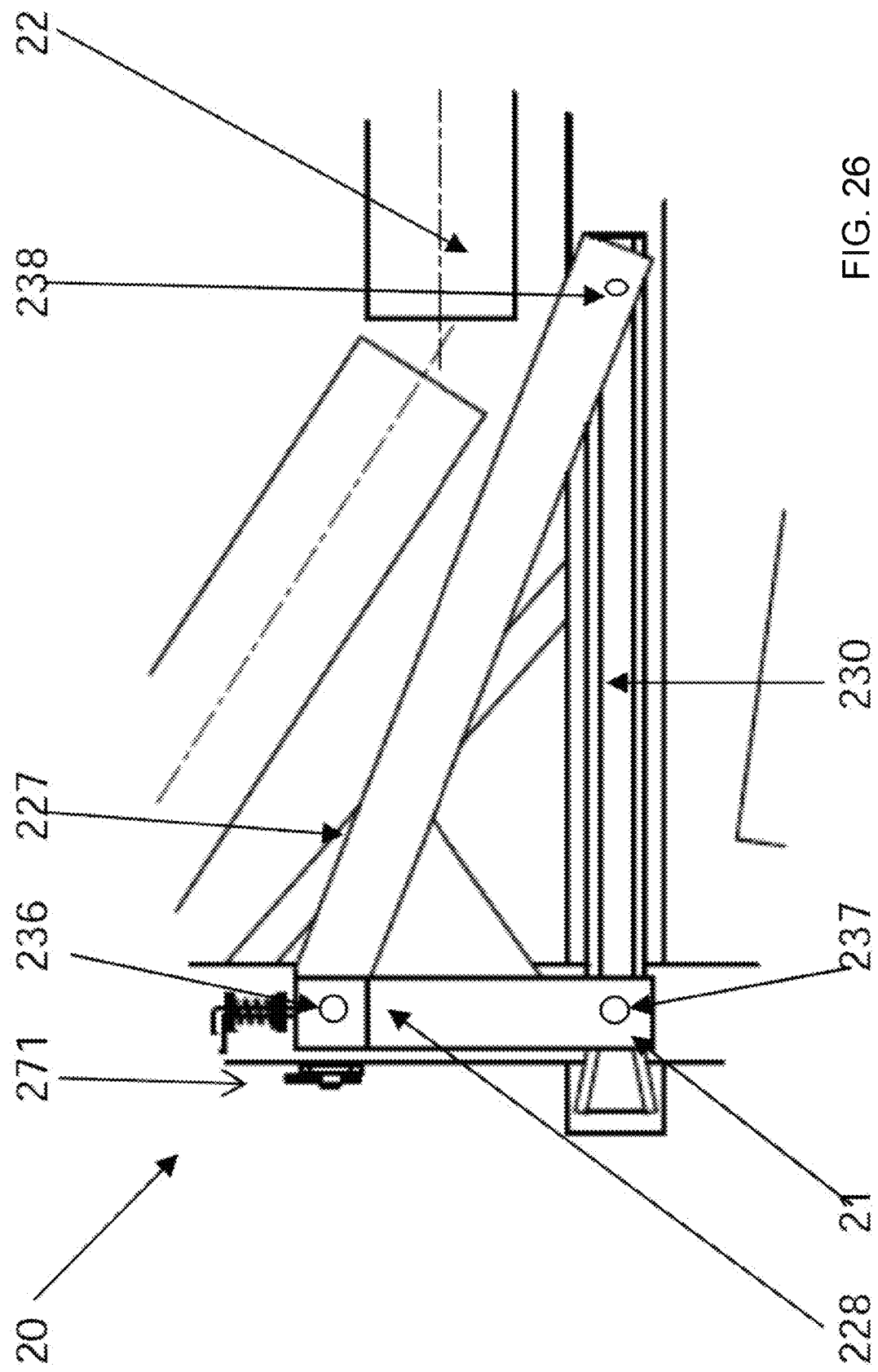
FIG. 26. Is the view of FIG. 10 with the stringer attached.

Having now described the channel members attached to the H frame, reference will now again be had to the stringer and reference will also be had particularly to FIG. 25 and FIG. 26. FIG. 25 illustrates the part of H frame containing the channel members 230 and 234 but without attachment of the stringer. FIG. 26 illustrates attachment of stringer. Referring particularly to FIG. 26, the stringer 116 is attached to the H frame at three spaced apart mounting points 236-238. Mounting points 236 and 237 are supported by the third small vertical member 228 of the stringer while the mounting point 238 is at the distal end of the second member 227 of the stringer. Another view of the attachment of the stringer to the H frame is illustrated in FIG. 28.

Each mounting point typically comprises a projection which can extend into the channel and be trapped by the channel. This can typically be achieved by making the projection somewhat T-shaped, or mushroom shaped. Once the mounting points have been slid into the respective channels, the locking pin 235 (which has been retracted) aligns with an opening (not illustrated) in the top of member 126 and can then be released such that the locking pin 235 locks into member 234 via the opening (not illustrated).

With this arrangement, the stringer can be securely held against the H frame and can be conveniently attached to and removed from H frame by releasing locking pin 235 and then sliding the stringer out of the respective channels on the walk side of the conveyor.

Because channel member 230 has a closed end, this facilitates easy attachment of stringer, as the mounting points 237, 238 can simply be slid along channel member 230 until mounting point 238 or some other portion abuts against the closed end. This configuration also aligns the locking pin 235 with the locking pin opening (not illustrated). Thus, the mounting points 236-238 are located on the proximal end of the stringer (that is the end which will be attached to the channel members on each frame.

The distal end of the stringer is attachable to an adjacent H frame. To allow this, the inbye side of the H-frame has a spigot 270 (see FIGS. 25 and 27 at least) to connect the outbye (distal) end of the stringer 216. The outbye end of stringer 216 engages with the spigot and is locked in position using a securing pin 271. This connection is flexible, providing articulation to suit vertical curves and changes in grade within an allowable limit.

The stringer had a strengthening gusset 246—see FIG. 29, and can be hinged 239.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

I claim:

1. A bay for a belt conveyor structure, the bay comprising:
a transverse support stand having a first part positionable adjacent one edge of the belt, a second part positionable adjacent another edge of the belt, and a third part between the first part and the second part; and
a stringer having a proximal end removeably attachable to the stand and a distal end, the proximal end being attachable to the first part at at least two spaced apart locations and also to the third part, the distal end adapted for connection to a point fixed relative to an adjacent bay of conveyor belt structure;
wherein the stringer comprises a rigid unit comprising an elongate first member adapted to extend from adjacent one transverse support stand to adjacent an adjacent transverse support stand, a second member extending from one end of the first part and inclined downwardly and adapted for attachment to the third part of the transverse support stand, and a third member extending from said one end of the first member and adapted for attachment to the first part of the transverse support stand.

2. The bay of claim 1, containing a single said stringer attached to said first part and said third part of the transverse support stand.

3. The bay of claim 2 comprising an attachment mechanism to attach the stringer to the third part of the transverse support stand, the attachment mechanism comprising an elongate support pin extending at least partially along the third part of the support stand, and a slotted clevis on the stringer to slidingly attach the stringer to the pin.

4. The bay of claim 3, wherein the pin extends from one side of the stand.

5. The bay of claim 3, wherein the pin comprises a narrower necked portion adjacent the one side of the stand, whereby positioning of the clevis on the necked portion enables the clevis to be removed from the pin.

6. The bay of claim 1, comprising idler rollers, roller supports on the first part and the second part of the stand to support the idler rollers, and a disconnection mechanism provided on the support stand to disconnect the idler rollers from at least one of the supports.

7. The bay of claim 6, wherein the disconnection mechanism comprises a lifting mechanism operable to lift the idler rollers off the roller support.

8. The bay of claim 7, wherein the lifting mechanism comprises a bell crank having a finger engageable with the roller to lift the roller off the roller support, and a push rod adapted to operate the bell crank to the lifting position.

9. The bay of claim 1, wherein the stringer comprises an attachment part adjacent the proximal end adapted for attachment to the distal end of a stringer on an adjacent bay to attach two said bays together.

10. A bay for a belt conveyor structure according to claim 1, in combination with a stand handling apparatus, the stand handling apparatus including:
    an upper roller assembly arranged to bring rollers thereof to a level above carry rollers of the transverse stand of the bay;
    a lower roller assembly arranged to bring rollers thereof to a level above return rollers of said stand;
    a grip and tilt assembly including grippers arranged to grasp and release the stand and further including a tilt actuator arranged to tilt the stand from a vertical orientation to an orientation for sideways motion between said upper rollers and said lower rollers; and
    a horizontal swing assembly coupled to the grip and tilt assembly for swinging the stand from the upper rollers and the lower rollers.

11. A bay for a belt conveyor structure comprising a H-frame unit of single piece construction consisting of two vertical members comprising the first part and the second part and a cross member therebetween comprising the third part, an upper carry idler set, a lower return idler set, an upper roller support on each vertical member to support the carry rollers, a lower roller support on each vertical member to support the return idler set, a removable stringer having a proximal end removeably attachable to the H-frame unit and a distal end, the proximal end being attachable to one vertical member of the H-frame unit at at least two spaced apart locations and attachable to the cross member, the distal end adapted for connection to an adjacent bay, and a disconnection mechanism adapted to drop the return rollers;
    wherein the stringer comprises a rigid unit comprising an elongate first member adapted to extend from adjacent one transverse support stand to adjacent an adjacent transverse support stand, a second member extending from one end of the first part and inclined downwardly and adapted for attachment to the third part of the transverse support stand, and a third member extending from said one end of the first member and adapted for attachment to the first part of the transverse support stand.

12. The bay of claim 11, comprising a single said stringer.

13. The bay of claim 11, comprising an attachment mechanism to attach the stringer to the cross member, the attachment mechanism comprising an elongate support extending at least partially along the cross member the stringer adapted for sliding attachment to the elongate support.

14. The bay of claim 11, wherein the disconnection mechanism comprises a lifting mechanism operable to lift the idler rollers off the roller support.

15. The bay of claim 14, wherein the lifting mechanism comprises a bell crank having a finger engageable with the roller to lift the roller off the roller support, and a push rod adapted to operate the bell crank to the lifting position.

* * * * *